(12) United States Patent
Kidoguchi et al.

(10) Patent No.: US 11,509,885 B2
(45) Date of Patent: Nov. 22, 2022

(54) STEREOSCOPIC IMAGE DISPLAY DEVICE, STEREOSCOPIC IMAGE DISPLAY METHOD, AND PROGRAM

(71) Applicant: EIZO Corporation, Hakusan (JP)

(72) Inventors: Satomi Kidoguchi, Hakusan (JP); Yu Kato, Hakusan (JP); Haifeng Chen, Hakusan (JP); Reo Aoki, Hakusan (JP); Masataka Shoji, Hakusan (JP)

(73) Assignee: EIZO Corporation, Hakusan (JP)

( * ) Notice: Subject to any disclaimer, the term of this patent is extended or adjusted under 35 U.S.C. 154(b) by 46 days.

(21) Appl. No.: 17/055,736

(22) PCT Filed: May 10, 2019

(86) PCT No.: PCT/JP2019/018800
§ 371 (c)(1),
(2) Date: Nov. 16, 2020

(87) PCT Pub. No.: WO2019/225361
PCT Pub. Date: Nov. 28, 2019

(65) Prior Publication Data
US 2021/0211629 A1 Jul. 8, 2021

(30) Foreign Application Priority Data

May 22, 2018 (JP) .............................. JP2018-097717

(51) Int. Cl.
*H04N 13/122* (2018.01)
*H04N 13/373* (2018.01)
(Continued)

(52) U.S. Cl.
CPC ........... *H04N 13/373* (2018.05); *G02B 30/25* (2020.01); *H04N 13/122* (2018.05);
(Continued)

(58) Field of Classification Search
CPC .. H04N 13/373; H04N 13/128; H04N 13/122; H04N 13/366; H04N 30/25
See application file for complete search history.

(56) References Cited

U.S. PATENT DOCUMENTS

2005/0089212 A1\* 4/2005 Mashitani ............ H04N 13/398
382/154
2009/0096863 A1\* 4/2009 Kim .................... G06K 9/00604
348/42
(Continued)

FOREIGN PATENT DOCUMENTS

JP H03-053793 A 3/1991
JP 2007-158787 A 6/2007
(Continued)

OTHER PUBLICATIONS

International Search Report dated Jul. 23, 2019 in corresponding application No. PCT/JP2019/018800; 4 pgs.

*Primary Examiner* — Jonathan R Messmore
(74) *Attorney, Agent, or Firm* — Maier & Maier, PLLC

(57) ABSTRACT

[Problem] The present invention provides a stereoscopic image display device, stereoscopic image display method, and a program capable of displaying the display target with a constant size and a constant aspect ratio even when the distance between the stereoscopic image display device and the user changes.

[Solution to Problem] The present invention provides a stereoscopic image display device comprising: a display part; an acquisition part configured to acquire an observation viewing distance that is a viewing distance from the display part to a user; and an adjustment part configured to adjust a display state of a display image based on a reference viewing (Continued)

distance and the observation viewing distance, wherein the display part is configured to display a stereoscopic image based on the display state.

12 Claims, 19 Drawing Sheets

(51) Int. Cl.
 *H04N 13/128* (2018.01)
 *H04N 13/366* (2018.01)
 *G02B 30/25* (2020.01)
 *H04N 13/337* (2018.01)

(52) U.S. Cl.
 CPC ......... *H04N 13/128* (2018.05); *H04N 13/366* (2018.05); *H04N 13/337* (2018.05); *H04N 2213/008* (2013.01)

(56) References Cited

U.S. PATENT DOCUMENTS

| | | | |
|---|---|---|---|
| 2011/0157555 A1* | 6/2011 | Mashitani | G03B 21/28 353/7 |
| 2012/0038754 A1* | 2/2012 | Na | H04N 13/183 348/51 |
| 2012/0206453 A1 | 8/2012 | Bruls et al. | |
| 2012/0229610 A1* | 9/2012 | Fukushima | H04N 13/243 348/47 |
| 2012/0249532 A1 | 10/2012 | Kawada | |
| 2012/0314933 A1 | 12/2012 | Morifuji et al. | |
| 2013/0169633 A1 | 7/2013 | Hattori et al. | |
| 2013/0235167 A1* | 9/2013 | Izawa | H04N 13/398 348/51 |
| 2014/0293006 A1* | 10/2014 | Masuda | H04N 13/139 348/43 |
| 2015/0229904 A1 | 8/2015 | Ishikawa et al. | |
| 2016/0360187 A1* | 12/2016 | Smithwick | G02B 30/27 |
| 2018/0288392 A1* | 10/2018 | Hicks | G09G 5/001 |

FOREIGN PATENT DOCUMENTS

| | | |
|---|---|---|
| JP | 2012-065066 A | 3/2012 |
| JP | 2012-205267 A | 10/2012 |
| JP | 2012-257022 A | 12/2012 |
| JP | 2013-504968 A | 2/2013 |
| JP | 2015-154101 A | 8/2015 |
| JP | 5869184 B2 | 2/2016 |

* cited by examiner

FIG.4

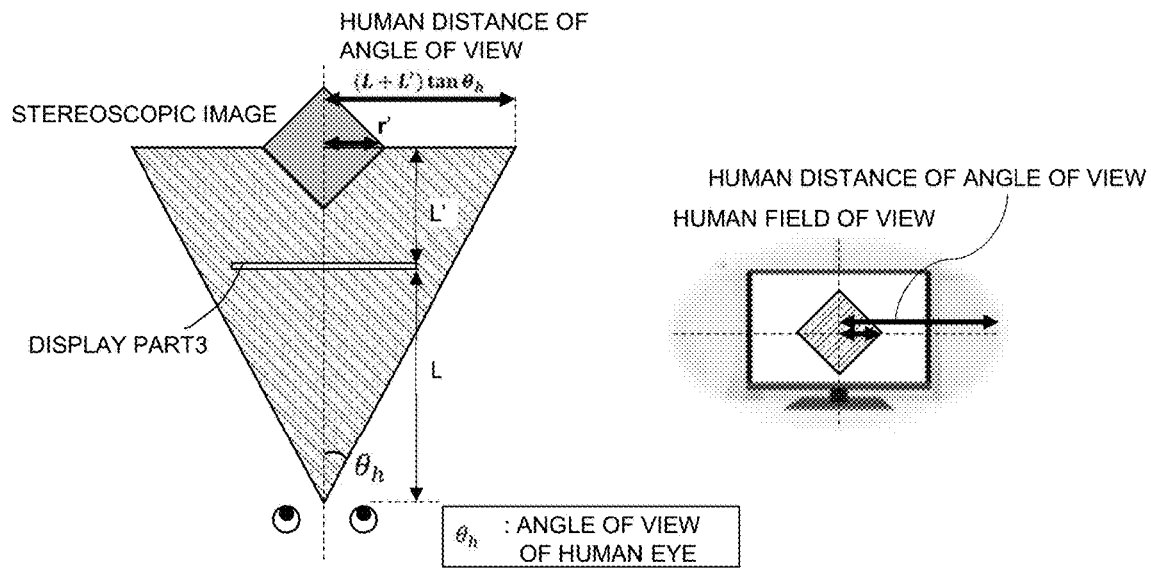

HUMAN VISUALLY RECOGNIZED SIZE S(L):
SIZE OF OBJECT WITHIN HUMAN FIELD OF VIEW (DISPLAY DISTANCE) = WIDTH r' OF STEREOSCOPIC IMAGE / HUMAN DISTANCE OF ANGLE OF VIEW

SUBSTITUTE $r' = \dfrac{2er}{2e-d}$, $L' = \dfrac{d}{2e-d}L$ FOR $S = \dfrac{r'}{(L+L')\tan\theta_h}$ $$S = \dfrac{2er}{2e-d} \times \dfrac{1}{\left(L+\dfrac{d}{2e-d}L\right)\tan\theta_h}$$

$$= \dfrac{2er}{L((2e-d)+d)\tan\theta_h}$$

$$= \dfrac{2er}{2eL\tan\theta_h}$$

$$S(L) = \dfrac{r}{L\tan\theta_h}$$

FIG.5

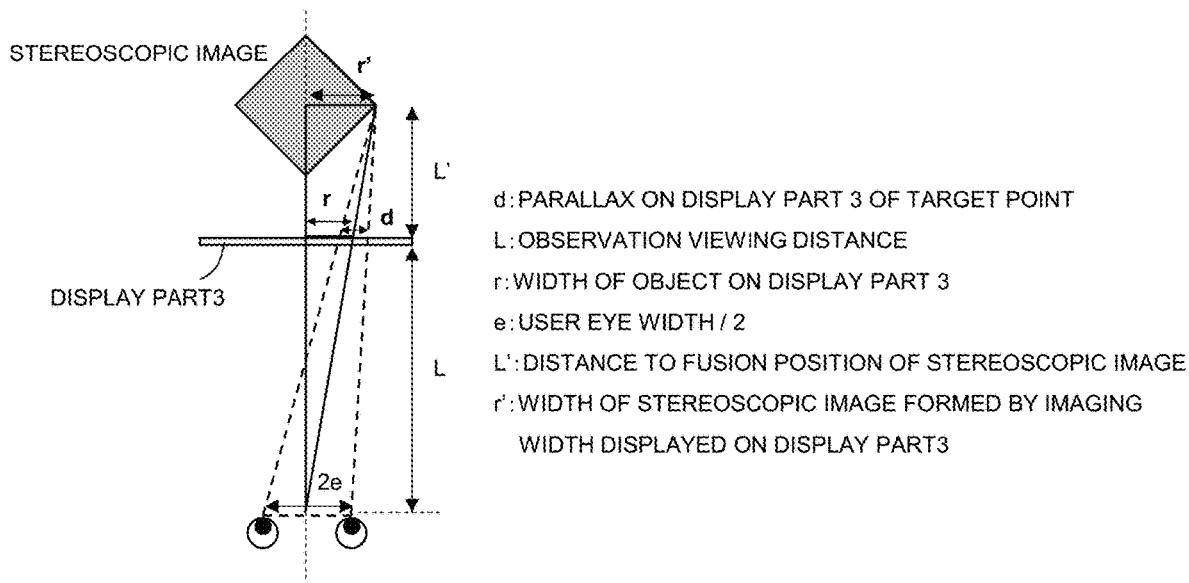

d: PARALLAX ON DISPLAY PART 3 OF TARGET POINT
L: OBSERVATION VIEWING DISTANCE
r: WIDTH OF OBJECT ON DISPLAY PART 3
e: USER EYE WIDTH / 2
L': DISTANCE TO FUSION POSITION OF STEREOSCOPIC IMAGE
r': WIDTH OF STEREOSCOPIC IMAGE FORMED BY IMAGING
    WIDTH DISPLAYED ON DISPLAY PART3

BASED ON SIMILAR FIGURES OF △

$$L' : d = (L + L') : 2e$$
$$\Leftrightarrow 2eL' = d(L + L')$$
$$\Leftrightarrow 2eL' = dL + dL'$$
$$\Leftrightarrow L'(2e - d) = dL$$
$$\Leftrightarrow \boxed{L' = \frac{d}{2e-d} L}$$

BASED ON SIMILAR FIGURES OF ▽

$$r : L = r' : (L + L')$$
$$\Leftrightarrow r' = \frac{r(L+L')}{L}$$

SUBSTITUTE $L' = \frac{d}{2e-d} L$ FOR $r' = \frac{r(L+L')}{L}$ $$r' = r + \frac{dr}{2e-d}$$

$$\boxed{r' = \frac{2er}{2e-d}}$$

FIG.6

$L_{base} \rightarrow L_{obs}$ : CHANGE OF VIEWING DISTANCE $r \rightarrow r' = r\alpha$ : SCALE ADJUSTMENT $d \rightarrow d' = (d+\beta)\alpha$ : PARALLAX ADJUSTMENT $$R_{scale} = \frac{S_{obs}(L_{obs})}{S_{base}(L_{base})} = \frac{r'}{L_{obs} \tan\theta_h} \times \frac{L_{base} \tan\theta_h}{r} = \frac{L_{base}}{L_{obs}} \frac{r'}{r} = \frac{L_{base}}{L_{obs}} \alpha$$

$R_{scale} = 1$ THEREFORE $\boxed{\alpha = \dfrac{L_{obs}}{L_{base}}}$ $$R_{aspect} = \boxed{\frac{A_{obs}(L_{obs})}{A_{base}(L_{base})}} = \boxed{\frac{2er'}{L_{obs}d'}} \times \boxed{\frac{L_{base}d}{2er}} = \frac{L_{base}}{L_{obs}} \frac{r'}{r} \frac{d}{d'}$$

$$= R_{scale} \frac{d}{d'} = \frac{L_{base}}{L_{obs}} \left(\frac{d}{d+\beta}\right)$$

$R_{aspect} = 1$ THEREFORE $\beta = \left(\dfrac{L_{base}}{L_{obs}} - 1\right)\hat{d}$

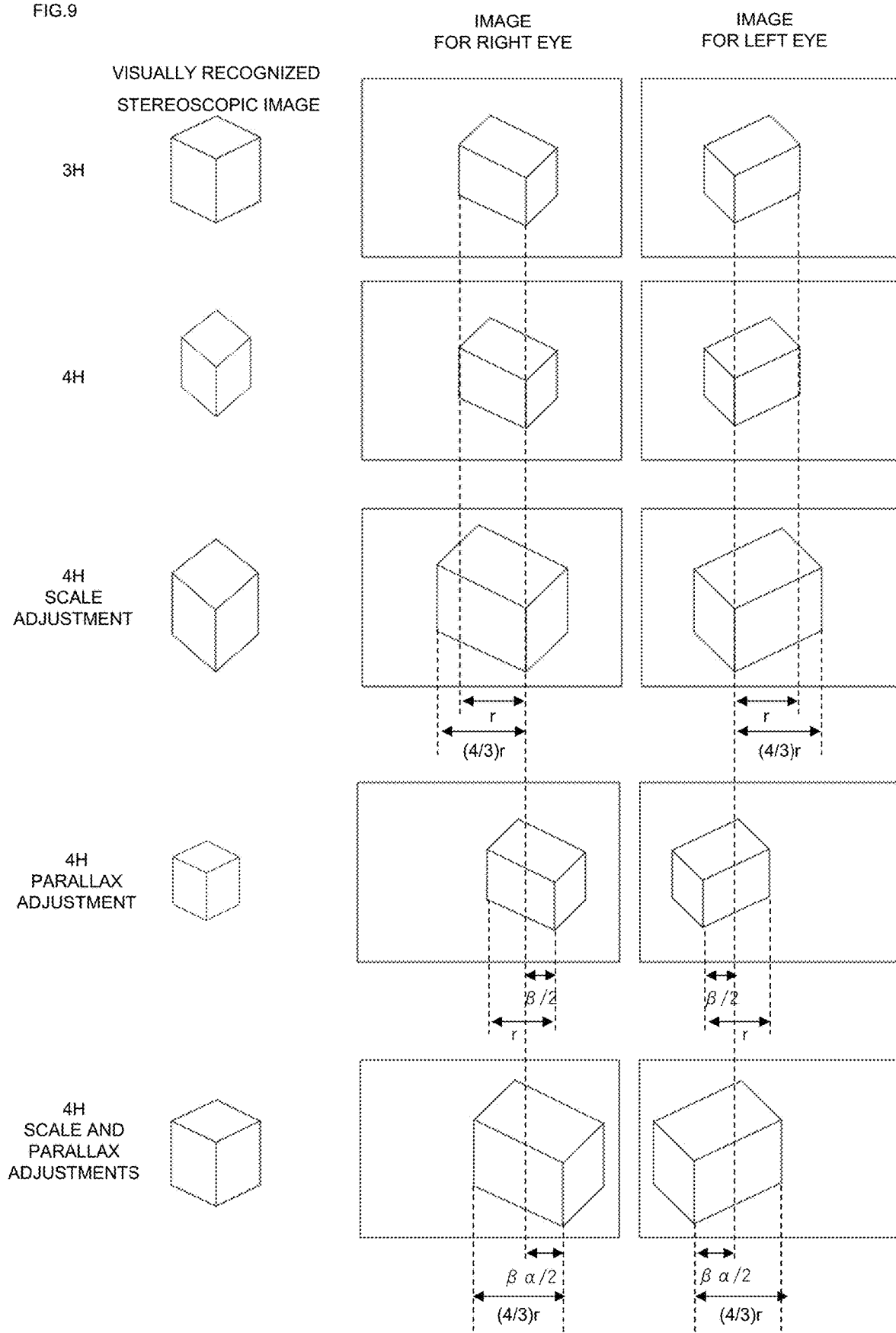

VISUALLY RECOGNIZED ASPECT RATIO A(L): $\dfrac{\text{WIDTH r' OF STEREOSCOPIC IMAGE}}{\text{IMAGING POSITION L'(DEPTH TO POINT P)}}$ SUBSTITUTE $\boxed{r' = \dfrac{2er}{2e-d}}$, $\boxed{L' = \dfrac{d}{2e-d}L}$ FOR $A = \dfrac{r'}{L'}$ $$A = \dfrac{2er}{2e-d} \times \dfrac{2e-d}{Ld}$$

$$\boxed{A(L) = \dfrac{2er}{Ld}}$$

FIG.16

| | | 26INCH<br>323.6 X 574.5[mm] | 32INCH<br>398.3 X 707.1[mm] | 55INCH<br>684.5 X 1215.4[mm] |
|---|---|---|---|---|
| OBSERVATION VIEWING DISTANCE: 3H<br><br>CHANGE OBSERVATION VIEWING DISTANCE ACCORDING TO DISPLAY SIZE<br>→ ASPECT RATIO CHANGES | OBSERVATION VIEWING DISTANCE | 970.8 | 1194.9 | 2053.5 |
| | Rscale(FIXED) | 1.00 | 1.00 | 1.00 |
| | Raspect | 1.00 | 0.81 | 0.47 |
| | Raspect AFTER ADJUSTMENT ($\Delta d=\alpha\beta$[mm]) | 1.00 | 1.00<br>($\Delta d \fallingdotseq 2.31$) | 1.00<br>($\Delta d \fallingdotseq 11.15$) |
| OBSERVATION VIEWING DISTANCE: 970.8mm<br><br>FIX OBSERVATION VIEWING DISTANCE REGARDLESS OF DISPLAY SIZE<br>→ SIZE RATIO CHANGES | OBSERVATION VIEWING DISTANCE | 970.8 | 970.8 | 970.8 |
| | Rscale | 1.00 | 1.23 | 2.12 |
| | Rscale AFTER ADJUSTMENT (SCALE ADJUSTMENT AMOUNT $\alpha$) | 1.00 | 1.00<br>($\alpha \fallingdotseq 0.81$) | 1.00<br>($\Delta\alpha \fallingdotseq 0.47$) |
| | Raspect(FIXED) | 1.00 | 1.00 | 1.00 |

FIG.18

$L_{base} \to L_{obs}$ : CHANGE OF VIEWING DISTANCE $r \to r_2 = r\,\alpha$ : CONTROL OF DISPLAY MAGNIFICATION $d \to d_2 = (d + \beta)\,\alpha$ : CONTROL OF DISPLAY PARALLAX $L' = \dfrac{d}{2e - d} L$  THEREFORE  $L'_{base} = \dfrac{d_1 L_{base}}{2e - d_1}$  $L'_{obs} = \dfrac{d_2 L_{obs}}{2e - d_2}$ $L'_{base} = L'_{obs}$  THEREFORE $$d_2 = \dfrac{2ed L_{base}}{(2e - d)L_{obs} + d L_{base}}$$

$r' = \dfrac{2er}{2e - d}$  THEREFORE  $r'_2 = \dfrac{2er_2}{2e - d_2}$ $r' = r'_2$  THEREFORE  $r_2 = \dfrac{2e - d_2}{2e - d} r$ $d_2 = \dfrac{2ed L_{base}}{(2e - d)L_{obs} + d L_{base}}$  THEREFORE  $\alpha = \dfrac{2e L_{obs}}{(2e - d)L_{obs} + d L_{base}}$  $\beta = \left(\dfrac{L_{base}}{L_{obs}} - 1\right) d$

FIG.19

DEPTHS $L'$ OF STEREOSCOPIC IMAGE AT REFERENCE VIEWING DISTANCE (3H) AND OBSERVATION VIEWING DISTANCE (4H)

$$L': \quad L' = \frac{d}{2e-d}3H, \quad L' = \frac{d_2}{2e-d_2}4H$$

PARALLAX $d_2$:
$$d_2 = \frac{6ed}{8e-d}$$

RADIUS $r'$ OF STEREOSCOPIC IMAGE VISUALLY RECOGNIZED AT OBSERVATION VIEWING DISTANCE (4H)

$$r' = \frac{2er_2}{2e-d_2}$$

RADIUS $r_2$:
$$r_2 = \frac{2e-d_2}{2e}r'$$

SUBSTITUTE ABOVE RESULT FOR CONTROL AMOUNTS $r_2 = r\alpha$ AND $d' = (d+\beta)\alpha$ $$\alpha = \frac{r_2}{r} = \frac{1}{r}\frac{2e-d_2}{2e}r' = \frac{1}{r}\frac{2e-d_2}{2e}\frac{2er}{2e-d} = \frac{2e-d_2}{2e-d} = \frac{8e}{8e-d}$$

$$\beta = \frac{d_2}{\alpha} - d = \frac{6ed}{8e-d}\frac{8e-d}{8e} - d = \frac{3d}{4} - d = -\frac{1}{4}d$$

STEREOSCOPIC IMAGE DISPLAY DEVICE, STEREOSCOPIC IMAGE DISPLAY METHOD, AND PROGRAM

TECHNICAL FIELD

The present invention relates to a stereoscopic image display device, a stereoscopic image display method, and a program for displaying an image that users can recognize as a stereoscopic image.

Stereoscopic image display devices, which display an image that users can recognize as a stereoscopic image, have been developed. For example, images for the right eye and left eye are displayed independently on a display device, users can recognize the image as the stereoscopic image by viewing the display device through 3D glasses.

The patent literature 1 discloses a three-dimensional image system capable of displaying a three-dimensional observation image having a depth that gives a stereoscopic effect desired by observers who observe a monitor.

CITATION LIST

Patent Literature

[Patent Literature 1] Japanese Patent No. 5869184

SUMMARY OF INVENTION

Technical Problem

When a distance between the stereoscopic image display device and the user changes, a size and an aspect ratio (width:depth) of the stereoscopic image recognized by the user change. For example, when endoscopic surgery is performed using the stereoscopic image display device, an appearance of a display target may change, which may interfere with the surgery.

The present invention has been made in view of the foregoing, and an object thereof is to provide a stereoscopic image display device, stereoscopic image display method, and a program capable of displaying the display target with a constant size and a constant aspect ratio even when the distance between the stereoscopic image display device and the user changes.

Solution to Problem

The present invention provides a stereoscopic image display device comprising: a display part; an acquisition part configured to acquire an observation viewing distance that is a viewing distance from the display part to a user; and an adjustment part configured to adjust a display state of a display image based on a reference viewing distance and the observation viewing distance, wherein the display part is configured to display a stereoscopic image based on the display state.

In the present invention, the adjustment part is configured to adjust the display state of the display image based on the reference viewing distance and the observation viewing distance. And the display part is configured to display a stereoscopic image based on the adjusted display state. Thus, an appearance of the display image at the reference viewing distance can be the same as an appearance of the display image at the observation viewing distance.

Various embodiments of the present invention are described below. Any of the embodiments described below can be combined with one another.

Preferably, the stereoscopic image display device further comprises: a calculation part configured to calculate a scale adjustment amount below, (the scale adjustment amount)= (the observation viewing distance/the reference viewing distance), wherein the adjustment part is configured to adjust a display scaling of the display image using the scale adjustment amount.

Preferably, the adjustment part is configured to adjust the display scaling of the display image according to following control equation 1 or control equation 2.

$(Ro) = (Rs \times \text{the scale adjustment amount})$, then                                             <The control equation 1>

Ro: the display scaling of the display image visually recognized at the observation viewing distance, Rs: the display scaling of the display image visually recognized at the reference viewing distance, $(So) = (Ss \times \text{the scale adjustment amount})$, then                                             <The control equation 2>

So: a size of the display image visually recognized at the observation viewing distance, Ss: a size of the display image visually recognized at the reference viewing distance.

Preferably, the stereoscopic image display device further comprises: a notification part; wherein at least one of lower and upper limits is set for the scale adjustment amount based on relative sizes of the display image and the display part, the notification part is configured to, when the following cases (1) or (2) is satisfied, notify that a condition of the stereoscopic image device is in the cases (1) or (2).

(1) The scale adjustment amount of the display image visually recognized at the observation viewing distance is less than the lower limit or more than the upper limit.

(2) A variation between a size of the display image visually recognized at the observation viewing distance and a size of the display image visually recognized at the reference viewing distance is outside a range allowed by the user.

Preferably, the stereoscopic image display device further comprises: a calculation part configured to calculate a parallax adjustment amount below, (the parallax adjustment amount)={(the reference viewing distance/the observation viewing distance)−1}, wherein the adjustment part is configured to adjust a parallax of the display image using the parallax adjustment amount.

Preferably, the display part is configured to display the images for the right eye and left eye independently, the adjustment part is configured to adjust the images for the right eye and left eye so that (1) the images for the right eye and left eye are close to or are far from one another to a distance corresponding to the parallax adjustment amount, or (2) the images for the right eye and left eye are close to or are far from one another to a distance corresponding to a product of the scale adjustment amount and the parallax adjustment amount.

Preferably, when an imaging position of the stereoscopic image is located on a display surface of the display part or is located in front of the display surface, the parallax adjustment amount is a lower limit.

Preferably, when an imaging position of the stereoscopic image is located at infinity, the parallax adjustment amount is an upper limit.

Preferably, the stereoscopic image display device further comprises: a notification part; wherein the notification part is configured to, when following cases (1), (2), or (3) is satisfied, notify that a condition of the stereoscopic image display device is in the cases (1), (2), or (3).

(1) The parallax adjustment amount of the display image visually recognized at the observation viewing distance is less than the lower limit.

(2) A variation between a width to depth ratio of the stereoscopic image visually recognized at the observation viewing distance and a width to depth ratio of the stereoscopic image visually recognized at the reference viewing distance is outside a range allowed by the user.

(3) A predetermined stereoscopic image at the observation viewing distance is no longer imaged.

Preferably, the stereoscopic image display device further comprises: a notification part; wherein the notification part is configured to, when following cases (1), (2), or (3) is satisfied, notify that a condition of the stereoscopic image display device is in the cases (1), (2), of (3).

(1) The parallax adjustment amount at the observation viewing distance is more than the upper limit.

(2) A variation between a width to depth ratio of the stereoscopic image that is visible at the observation viewing distance and a width to depth ratio of the stereoscopic image that is visible at the reference viewing distance is outside a range allowed by the user.

(3) A predetermined stereoscopic image at the observation viewing distance is no longer imaged.

Preferably, the parallax is determined based on a histogram of the parallax included in an attention area of the display part.

Preferably, the adjustment part is configured to adjust the display state of the display image based on the reference viewing distance and the observation viewing distance so that a width and a depth of the stereoscopic image visually recognized at the observation viewing distance are fixed.

Another viewpoint in the various embodiments of the present invention provides that a stereoscopic image display method comprising: acquiring an observation viewing distance that is a viewing distance from a display part to a user; adjusting a display state of a display image based on a reference viewing distance and the observation viewing distance; and displaying a stereoscopic image based on the display state.

Another viewpoint in the various embodiments of the present invention provides that a program causing a computer to function as: a display part; an acquisition part configured to acquire an observation viewing distance that is a viewing distance from the display part to a user; and an adjustment part configured to adjust a display state of a display image based on a reference viewing distance and the observation viewing distance, wherein the display part is configured to display a stereoscopic image based on the display state.

BRIEF DESCRIPTION OF DRAWINGS

FIG. 4 shows a formula for deriving a size S(L) of a stereoscopic image that is visually recognized by a human.

FIG. 5 is an explanatory diagram of parameters used in the formula for deriving S(L).

FIG. 6 shows a formula that derives a scale adjustment amount $\alpha$ and a parallax adjustment amount $\beta$, which are used when adjusting an display state of the display image, using a size ratio Rscale of the stereoscopic image and an aspect ratio Raspect of the stereoscopic image.

FIG. 9 is a diagram corresponding to FIGS. 7A to 7B and FIGS. 8A to 8C, and is a diagram showing the stereoscopic image visually recognized by the user and the display image displayed on the stereoscopic image display device 1.

FIG. 16 shows experimental results using the stereoscopic image display device 1 of the present invention.

FIG. 18 is a diagram showing the formula for deriving the scale adjustment amount $\alpha$ and the parallax adjustment amount $\beta$ in the modified embodiment.

FIG. 19 is a diagram for explaining calculations of the scale adjustment amount $\alpha$ and the parallax adjustment amount $\beta$ in the modified embodiment.

DESCRIPTION OF EMBODIMENTS

Embodiments of the present invention will be described below. Any of the features in the embodiments described below can be combined with one another.

Figure 1:
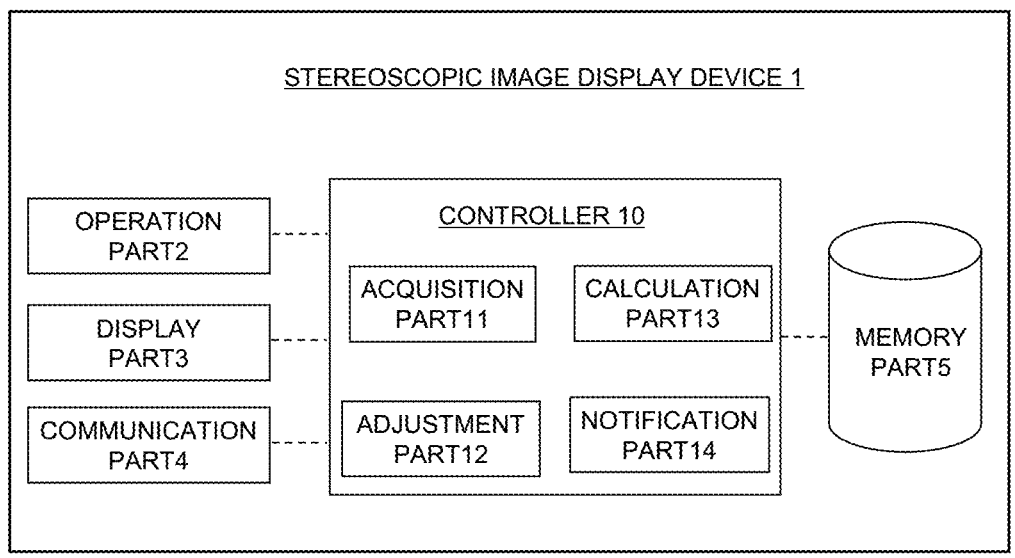
FIG. 1 is a functional block diagram of a stereoscopic image display device 1 according to the embodiment of the present invention.

Hereinafter, a stereoscopic image display device 1 according to the embodiment of the present invention will be described with reference to FIG. 1.

1. Configurations of Stereoscopic Image Display Device 1

The stereoscopic image display device 1 includes an operation part 2, a display part 3, a communication part 4, a memory part 5, and a controller 10.

The operation part 2 is configured to operate the stereoscopic image display device 1, and includes, for example, a touch panel, a keyboard, a switch, a voice input part, or a motion detector. The display part 3 displays various images (including still images and moving images), and includes, for example, a liquid crystal display, an organic EL display, an arbitrary touch panel display. The communication part 4 is configured to send and receive various data to and from the controller 10 or other information processing devices and includes arbitrary I/O. The memory part 5 stores various programs and parameters and formulas used for adjusting the display image executed by the stereoscopic image display device 1, and includes, for example, a memory, an HDD, or an SSD.

The controller 10 includes an acquisition part 11, an adjustment part 12, a calculation part 13, and a notification part 14. The controller 10 reads programs and executes various arithmetic processes, and includes, for example, a CPU. The acquisition part 11 is configured to acquire an observation viewing distance, which is a viewing distance from the display part 3 to a user. The acquisition part 11 may include, for example, a camera or a sensor. Note that the acquisition part 11 may acquire the observation viewing distance from the camera or sensor provided inside or outside the stereoscopic image display device 1. In addition, the stereoscopic image display device 1 may be configured such that the user operates the operation part 2 and inputs the observation viewing distance. For example, the stereoscopic image display device 1 may be configured such that the user inputs the observation viewing distance on the OSD (On Screen Display) by the operation part 2.

The adjustment part 12 is configured to adjust a display state of the display image displayed on the display part 3 based on a reference viewing distance and the observation viewing distance. Here, the reference viewing distance is a viewing distance that serves as a reference for the size of the stereoscopic image and the parallax that is visually recognized by the user. The stereoscopic image display device 1 of the embodiment is adjusted so that the display target looks most natural when the stereoscopic image display device 1 is observed from the reference viewing distance. Here, the reference viewing distance is arbitrary, and in the embodiment, the reference viewing distance is set to three times the height H of the display part 3. The reference viewing distance is not limited to this and may be set to a specific numerical value without using the height H of the display part 3. And the display part 3 displays the stereoscopic image based on the display state adjusted by the adjustment part 12. Here, the stereoscopic image is actually a two-dimensional image displayed in display part 3 and is configured so that the images for the right eye and left eye can be displayed independently. And the images for the right eye and left eye are images obtained by capturing the same image target using the right eye and the left eye cameras, and the images for the right eye and left eye are images that include parallax. And the user recognizes the display image as the stereoscopic image by viewing the display part 3 while wearing 3D glasses. Specifically, the display part 3 may adopt a "passive method". In the passive method, the display part 3 displays images for the right eye and left eye alternately for each line and is provided with a polarizing filter having lines that are polarized in different directions, and the 3D glasses are provided with polarizing filters provided on the left and right lenses respectively and having lines that are polarized in different directions. Thus, in the passive method, the user can recognize the stereoscopic image by viewing the display part 3 through the 3D glasses. The display method of the stereoscopic image is not limited to this, and the display part 3 may adopt a known method such as the "active shutter method".

The calculation part 13 is configured to calculate a scale adjustment amount. In this embodiment, the scale adjustment amount is a numerical value represented by "the scale adjustment amount $\alpha$=(the observation viewing distance/the reference viewing distance)". Here, the "scaling" means changing the magnification of the display image and includes the case of partially changing the magnification of the display image. Then, adjustment part 12 adjusts the display scale of the display image using the scale adjustment amount calculated by calculation part 13. In the embodiment, such processing is referred to as scale adjustment processing.

In addition, the calculation part 13 is configured to calculate a parallax adjustment amount. In this embodiment, the parallax adjustment amount is a numerical value represented by "the parallax adjustment amount $\beta=\{$(the reference viewing distance/the observation viewing distance)$-1\}\times$parallax". Here, the parallax represents the amount of misalignment between the display target represented by the image for the right eye and the display target represented by the image for the left eye in the display image displayed on the display part 3. Then, the adjustment part 12 adjusts the parallax of the display image using the parallax adjustment amount calculated by calculation part 13. In the embodiment, such processing is referred to as parallax adjustment processing.

Each of the above components may be realized by software or hardware. When realized by software, various functions can be realized by the CPU executing programs. The program may be stored in built-in memory or a non-transitory readable medium by a computer. Alternatively, the above functions are realized by reading the program stored in external memory using so-called cloud computing. When realized by hardware, the above functions can be performed by various circuits such as ASIC, FPGA, or DRP. The embodiment deals with various information and concepts including this information, and the various information is a bit group of binary numbers having 0 or 1, and the various information is represented according to the level of signal value. And in the embodiment, communications and calculations can be executed according to configurations of the above software and hardware.

2. Scale Adjustment Processing

Next, the scale adjustment processing will be described with reference to FIGS. 2 to 10.

Figure 2:
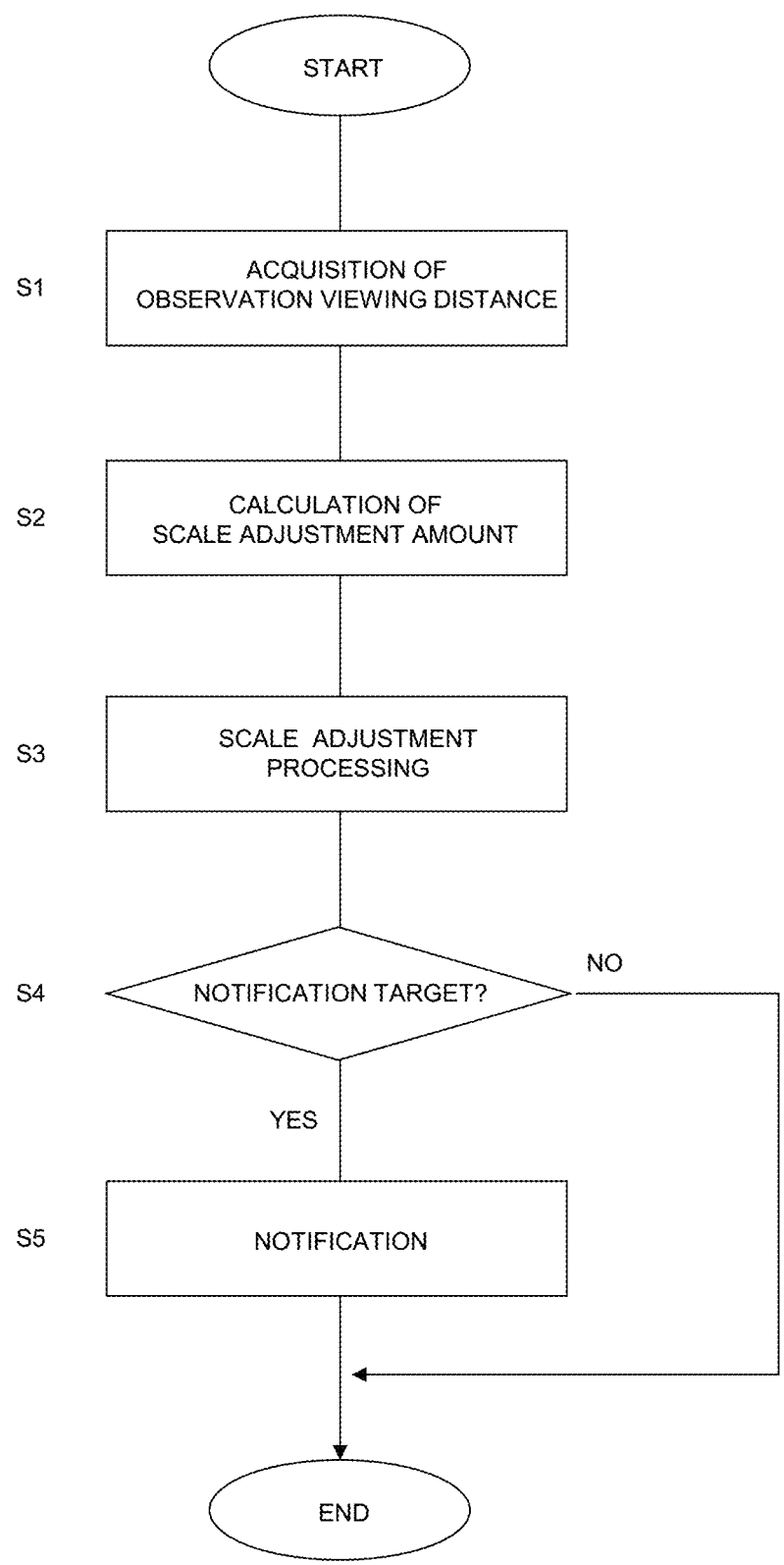
FIG. 2 is a flowchart showing scale adjustment processing executed by the stereoscopic image display device 1.
Figure 3A:
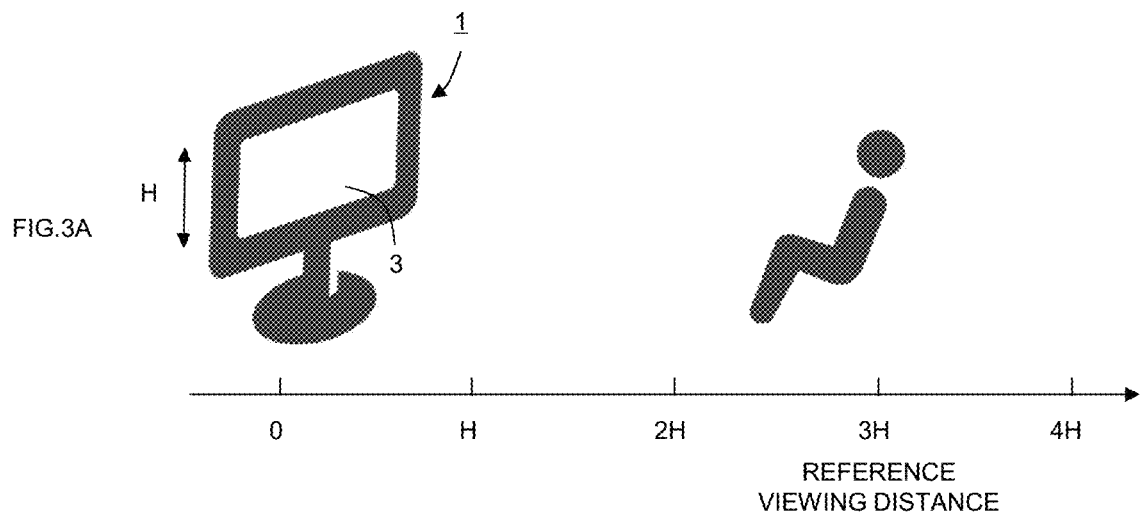
FIG. 3A is a schematic diagram showing the stereoscopic image display device 1 from a reference viewing distance.
Figure 3B:
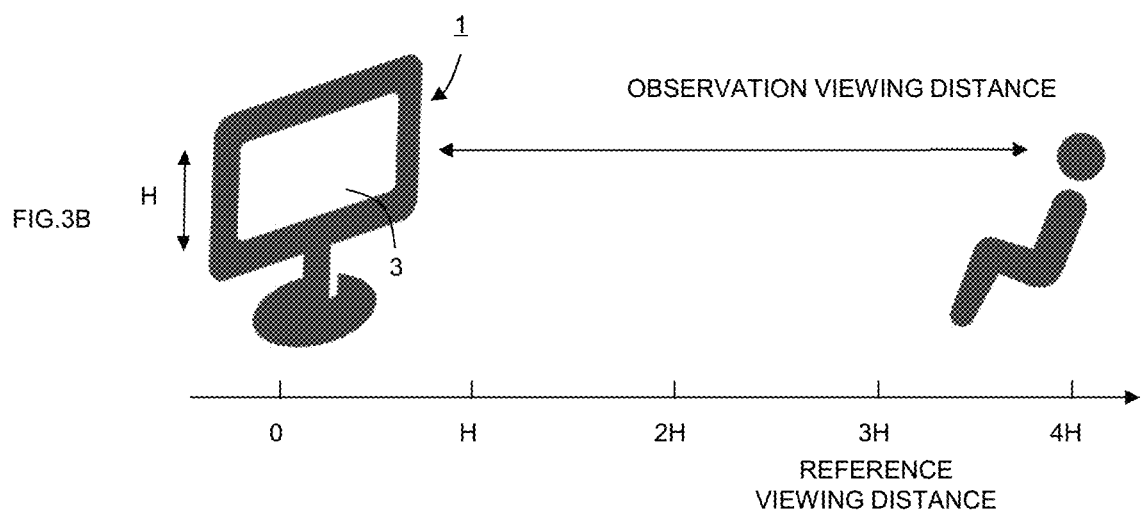
FIG. 3B is a schematic diagram showing the stereoscopic image display device 1 from an observation viewing distance.

As shown in FIG. 2, in S1, the observation viewing distance is acquired by the acquisition part 11. Hereinafter, in the embodiment, the reference viewing distance (the viewing distance: 3H) shown in FIG. 3A will be described using an example of the observation viewing distance (the viewing distance: 4H) shown in FIG. 3B.

Next, in S2, the scale adjustment amount is calculated by calculation part 13. The scale adjustment amount is the amount to adjust the scale of the display image displayed in display part 3. And the scale adjustment amount is the amount for adjusting the scaling of the image so that the display target can be visually recognized at the same size when the user views the display target at the reference viewing distance as when the user views the display target at the observation viewing distance. Hereinafter, the scale adjustment amount will be described with reference to FIGS. 4 to 6.

<Scale Adjustment Amount>

FIG. 4 is a plan view schematically showing a state in which the user is viewing the stereoscopic image display device 1. In FIG. 4, the vertical direction of the stereoscopic image represents the depth of the stereoscopic image viewed by the user. As shown in FIG. 5, in the embodiment, a size S(L) of the stereoscopic image visually recognized by a human is defined as "a size of an object in a range (screen distance) of the human's view". This is represented by "the stereoscopic image width r'/human distance of angle of view". Here, the human distance of angle of view is represented by the horizontal distance of the image that fits within the limit of the human's field of view in the left-right direction. And the human distance of angle of view is represented by "(L+L')tan θh (θh: angle of view of the human's eye)". Therefore, the relationship "S(L)=r'/(L+L') tan θh" holds up.

Here, as shown in FIG. 5, "L" and "r'" are represented as "L'=dL/(2e−d)" and "r'=2er/(2e−d)", respectively, based on the similarity of triangles. Substituting these into the equation of FIG. 4 gives the relationship "S(L)=r/L tan θh".

Next, as shown in FIGS. 6 and 7, when the display image displayed with the width r at the reference viewing distance (Lbase) is observed from the observation viewing distance (Lobs), the size of the display image appears to change. For example, the stereoscopic image, which is visible to the user, is relatively large when the user views the stereoscopic image at the observation viewing distance that is closer to the stereoscopic image display device 1 than the reference viewing distance. On the other hand, the stereoscopic image, which is visible to the user, is relatively small when the user views the stereoscopic image at the observation viewing distance that is farther from the stereoscopic image display device 1 than the reference viewing distance. To solve the above problem, the scale adjustment amount α is calculated to keep the size S(L) of the stereoscopic image visible to a human constant even when the human observes the stereoscopic image from the observation viewing distance (Lobs) different from the reference viewing distance (Lbase). In this embodiment, when the width of the display image is r at the reference viewing distance (Lbase), the width r' of the display image at the actual observation viewing distance (Lobs) is controlled to be "r'=rα". Here, the width r' of the display image and the width r' of the stereoscopic image are different.

α is obtained as follows. That is, α is obtained by calculating α such that Rscale, which is the value obtained by dividing "the size Sobs (Lobs) of the stereoscopic image that the human views at the observation viewing distance" by "the size Sbase (Lbase) of the stereoscopic image that the human's views at the reference viewing distance", becomes 1, thus giving the relationship "α=Lobs (the observation viewing distance)/Lbase (the reference viewing distance)".

Next, in S3 of FIG. 2, the adjustment part 12 executes the scale adjustment processing. Hereinafter, the scale adjustment processing will be described with reference to FIGS. 7 to 9.

<Scale Adjustment Processing>

Figure 7A:
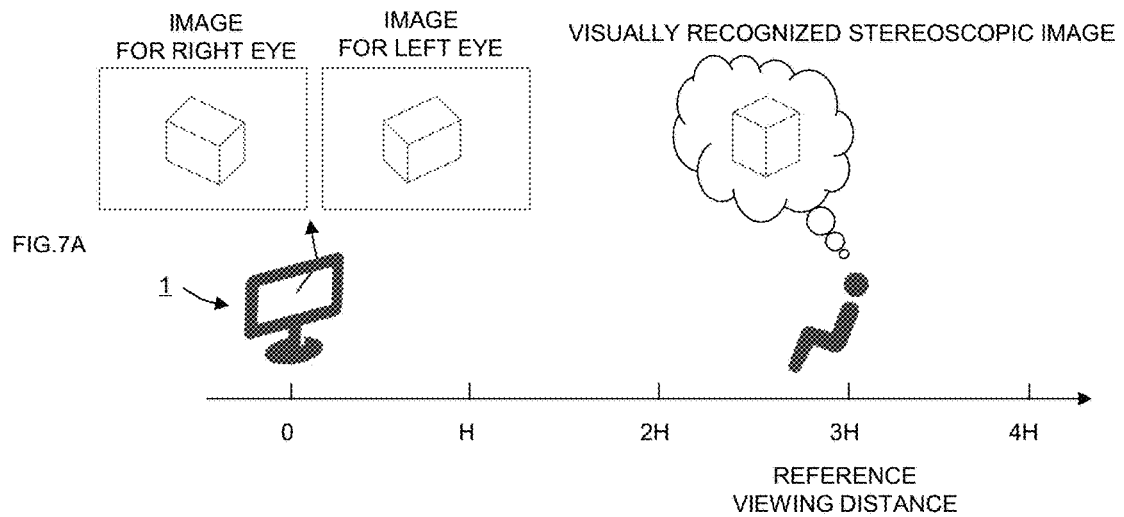
FIG. 7A is a schematic diagram showing a state of viewing the stereoscopic image display device 1 at the reference viewing distance.
Figure 7B:
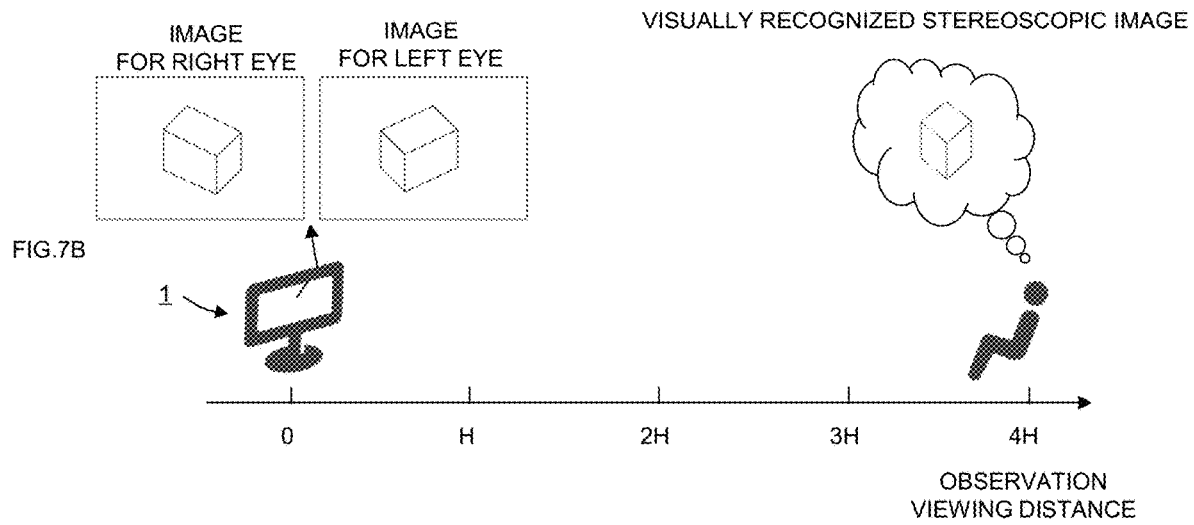
FIG. 7B is a schematic diagram showing a state of viewing the stereoscopic image display device 1 at the observation viewing distance.
Figure 8A:
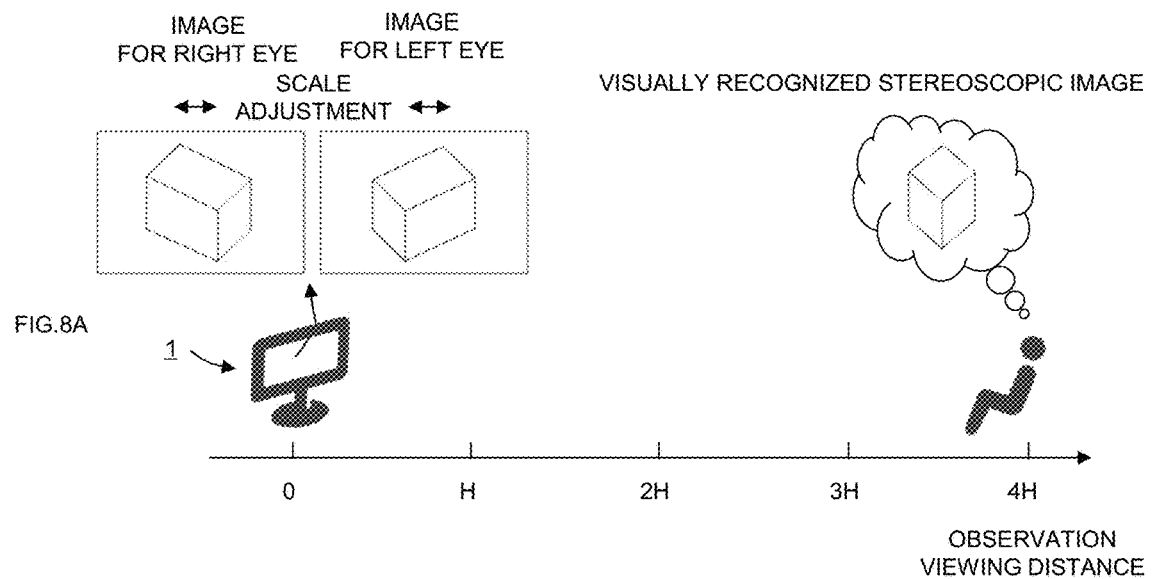
FIG. 8A is a schematic diagram in the case the scale adjustment processing is executed when the user views the stereoscopic image display device 1 at the observation viewing distance.

As shown in FIG. 7A, by displaying the predetermined images for the right eye and left eye independently on the stereoscopic image display device 1, the user who observes the stereoscopic image display device 1 at the reference viewing distance (3H) recognizes the display image as the stereoscopic image. Then, as shown in FIG. 7B, when the stereoscopic image display device 1 is observed from the observation viewing distance (4H), the stereoscopic image, visually recognized by the user, looks small. This is because the images for the right eye and left eye displayed on the stereoscopic image display device 1 have not changed, but the viewing distance between the stereoscopic image display device 1 and the user increases. In addition, the depth of the stereoscopic image visually recognized by the user increases. FIG. 8A represents a state in which the scale adjustment processing is executed in this state. In this embodiment, the scaling of the display image in FIGS. 7A and 7B is multiplied by α. Thus, the user can visually recognize, even when the user observes the stereoscopic image display device 1 at the observation viewing distance (4H), the display target at the same size as when the user observes the stereoscopic image display device 1 at the reference viewing distance (3H).

FIG. 9 is a diagram for explaining the scale adjustment processing in FIG. 8A. As shown in FIG. 9, the stereoscopic image visually recognized at the observation viewing distance (4H) is smaller and the depth of the stereoscopic image visually recognized at the reference viewing distance (3H) increases. Therefore, α is calculated in order to execute the scale adjustment processing. In the example of FIGS. 7 to 9, "α=Lobs (the observation viewing distance)/Lbase (the reference viewing distance)=4/3". Then, in the scale adjustment processing, the size S(L) of the stereoscopic image visually recognized by the user becomes constant by multiplying the width r of the display target by α (=4/3) based on a predetermined point.

Here, the configuration of the scale adjustment processing is not limited to this. The adjustment part 12 is configured to adjust the display scaling of the display image, for example, according to following control equation 1 or control equation 2.

(Ro)=(Rs×the scale adjustment amount), then  <The control equation 1>

Ro: the display scaling (display magnification) of the display image visually recognized at the observation viewing distance, Rs: the display scaling (display magnification) of the display image visually recognized at the reference viewing distance, (So)=(Ss×the scale adjustment amount), then  <The control equation 2>

So: the size of the display image visually recognized at the observation viewing distance, Ss: the size of the display image visually recognized at the reference viewing distance.

Next, in S4 of FIG. 2, the controller 10 determines whether a result after executing the scale adjustment processing is a notification target. In the embodiment, it is determined whether the result is the notification target based on whether the scale adjustment processing is within a controllable range, which will be described with reference to FIG. 10.

<Controllable Scale Adjustment Range>

Figure 10A:
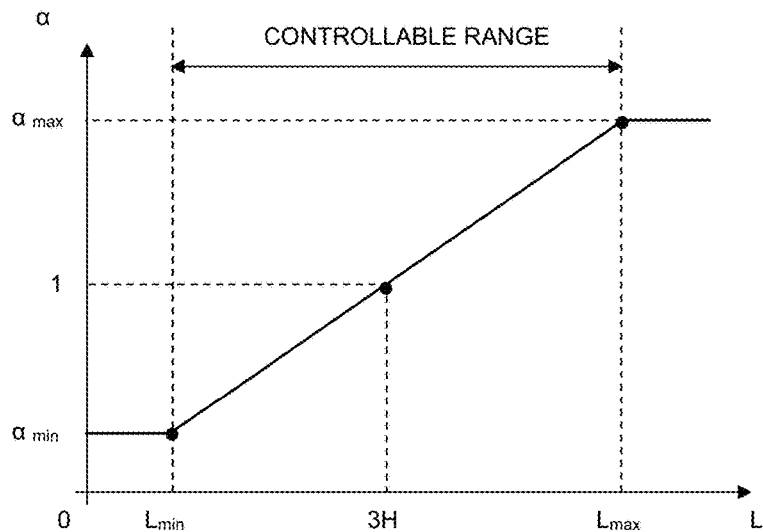
FIG. 10A is a graph showing a scaling range that can be controlled by the stereoscopic image display device 1.

As shown in FIG. 10A, α is proportional to the observation viewing distance L between an upper limit (αmax) and a lower limit (αmin) of the scale adjustment amount. When the observation viewing distance L is equal to or greater than Lmax corresponding to αmax, α is αmax and is a constant value. On the other hand, when the observation viewing distance L is equal to or less than Lmax corresponding to αmin, α is αmin and is a constant value.

Figure 10B:
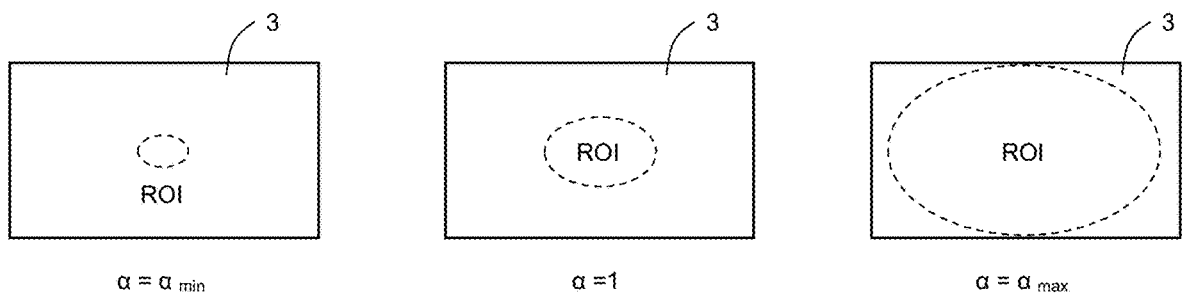
FIG. 10B is a schematic diagram for explaining an upper limit of scaling correction.

As shown in FIG. 10B, the upper limit of α (αmax) is determined by the relative size of the display target and the display part 3. Then, this display target is the attention area ROI, which is a target area for the scale adjustment processing. ROI is an abbreviation for Region of Interest. In the embodiment, α, when the attention area ROI is the limit within the display part 3, is defined as αmax. Here, if α is made larger than αmax, a part of the attention area ROI will not fit within display part 3. Therefore, as shown in FIG. 10A, when L is Lmax corresponding to αmax or more, the configuration of the embodiment sets α to αmax which is constant. As a result, it is possible to avoid the situation where the attention area ROI does not fit within the display part 3.

On the other hand, the lower limit of α (αmin) is defined by the visible limit of the attention area ROI or the minimum size required by the user. As shown in FIG. 10B, in the case that α is αmin, the display target is the visible limit or the minimum size required by the user. Here, if α is made smaller than αmin, the attention area ROI becomes too small and the visibility is lowered. Therefore, as shown in FIG. 10A, when L is Lmin corresponding to αmin or less, the configuration of the embodiment sets α to αmin which is constant. As a result, it is possible to maintain the state in which the size of the attention area ROI is minimized.

As described above, in the embodiment, the lower limit and/or the upper limit of the scale adjustment amount is set by the relative size of the display image and the display part 3. Then, in S4 of FIG. 2, if α is out of the controllable range, the controller 10 determines that the result after executing the scale adjustment processing is the notification target, and the processing proceeds to S5. Then, in S5, the notification part 14 notifies an external terminal (for example user terminal) that α is out of the controllable range. That is, in the embodiment, when the scale adjustment amount at the observation viewing distance is below the lower limit or above the upper limit, the notification part 14 notifies that. This allows the user to prevent moving to an inappropriate observation viewing distance by notifying the user terminal from the notification part 14, for example, when the user is too far away or too close to the stereoscopic image display device 1.

Here, the determination method of the notification target is not limited to this. For example, the notification part 14 may notify it when a variation between a visually recognized size at the observation viewing distance and a visually recognized size at the reference viewing distance is outside a range allowed by the user. Here, the variation represents the rate of enlargement or reduction of the visually recognized size at the observation viewing distance with respect to the visually recognized size at the reference viewing distance. For example, in the case that the variation allowed by the user is 25%, the notification part 14 may notify it when the visually recognized size at the observation viewing distance is outside the range of 25% from the visually recognized size at the reference viewing distance. For example, the visually recognized size of the attention area ROI, when the user observes the stereoscopic image display device 1 at the position corresponding to Lmax shown in FIG. 10A, is the same as the visually recognized size of the attention area ROI at the reference viewing distance. When the user moves further away from the stereoscopic image display device 1, that is, the observation viewing distance increases, the size of the attention area ROI visually recognized by the user becomes smaller because α is αmax which is constant. However, when the visually recognized size of the attention area ROI is within the range of 25% from the visually recognized size at the reference viewing distance, the upper limit of the observation viewing distance regarding the notification target can be set larger compared to the above example, by allowing the change of the visually recognized size Here, the range of the variation allowed by the user may be 10, 15, 20, 25, 30, 35, 40, 45, 50%, and the variation may be within the range between any two of the values exemplified here.

On the other hand, the visually recognized size of the attention area ROI, when the user observes the stereoscopic image display device 1 at the position corresponding to Lmin shown in FIG. 10A, is the same as the visually recognized size of the attention area ROI when the user observes the stereoscopic image display device 1 at the reference viewing distance. When the user further approaches to the stereoscopic image display device 1, that is, the observation viewing distance decreases, the size of the attention area ROI visually recognized by the user becomes larger because α is αmin which is constant. However, when the visually recognized size of the attention area ROI is within the range of 25% from the visually recognized size at the reference viewing distance, the lower limit of the observation viewing distance regarding the notification target can be set larger compared to the above example by allowing the change of the visually recognized size.

That is, in the embodiment, the notification part 14 is configured to, when the following cases (1) or (2) is satisfied, notify that a condition of the stereoscopic display device 1 is in the cases (1) or (2).

(1) The scale adjustment amount at the observation viewing distance is less than the lower limit or more than the upper limit.

(2) The visually recognized size at the observation viewing distance is outside the range of 25% from the visually recognized size at the reference viewing distance.

On the other hand, when α is within the controllable range, the controller 10 determines that the result after executing the scale adjustment processing is not the notification target, and S5 is skipped. In this embodiment, S4 is executed after S3 for the convenience of the explanation. However, S4 may be executed before S3, or S4 may be executed at the same time as S3.

3. Parallax Adjustment Processing

Figure 11:
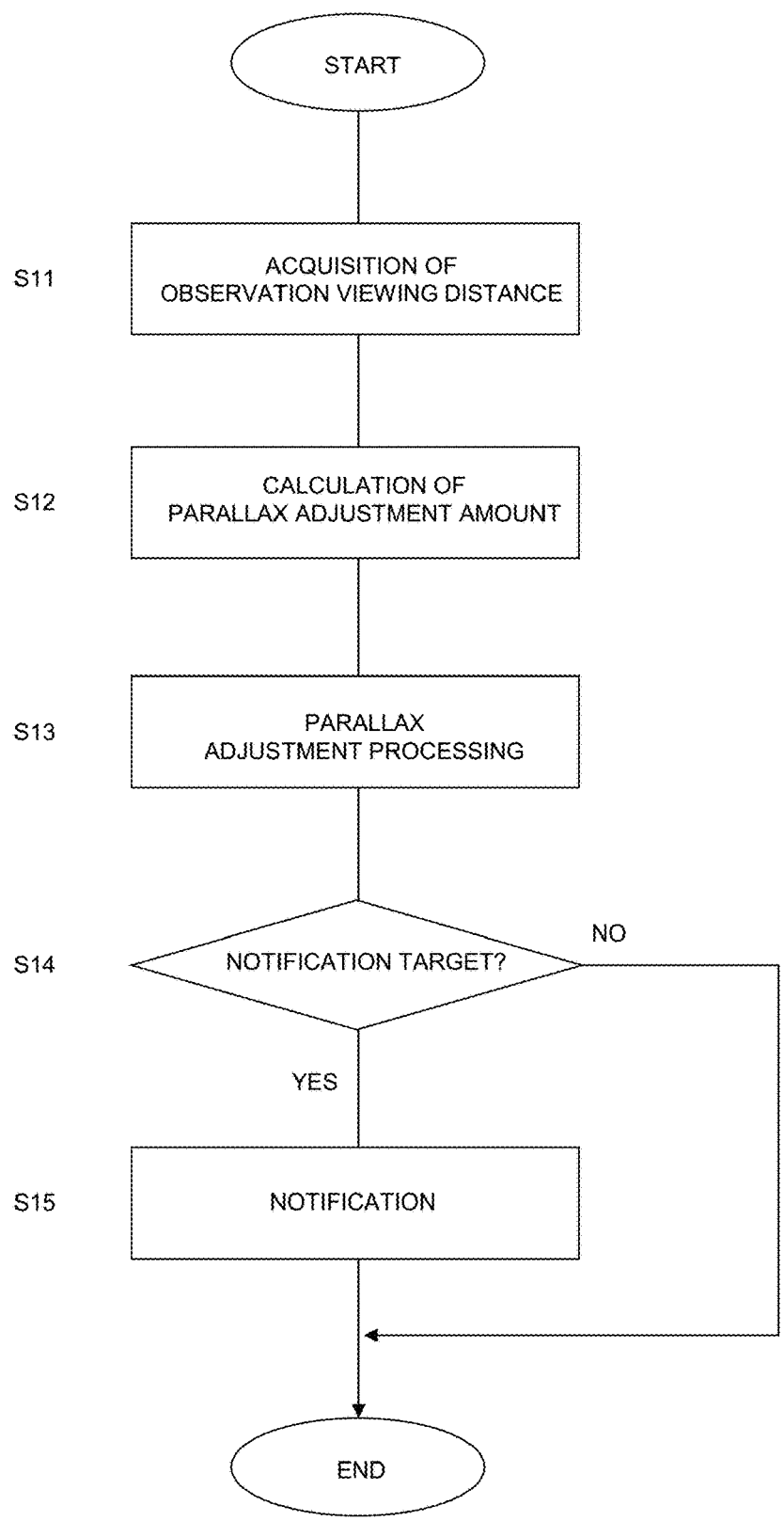
FIG. 11 is a flowchart showing the parallax adjustment processing executed by the stereoscopic image display device 1.

Next, the parallax adjustment processing will be described with reference to FIGS. 7 to 9 and FIGS. 11 to 15. As shown in FIG. 11, in S11, the observation viewing distance is acquired by the acquisition part 11. Next, in S12, the parallax adjustment amount is calculated by the calculation part 13. The parallax adjustment amount is the amount for adjusting the parallax of the display image displayed on the display part 3. And the parallax adjustment amount is the amount for adjusting the parallax of the display image so that the display target can be visually recognized, even when the user views the display target at the observation viewing distance, at the same depth (width to depth ratio:aspect ratio) as when the user views the display target at the reference viewing distance. Hereinafter, the parallax adjustment amount will be described with reference to FIGS. 12 to 15.

Figure 12:
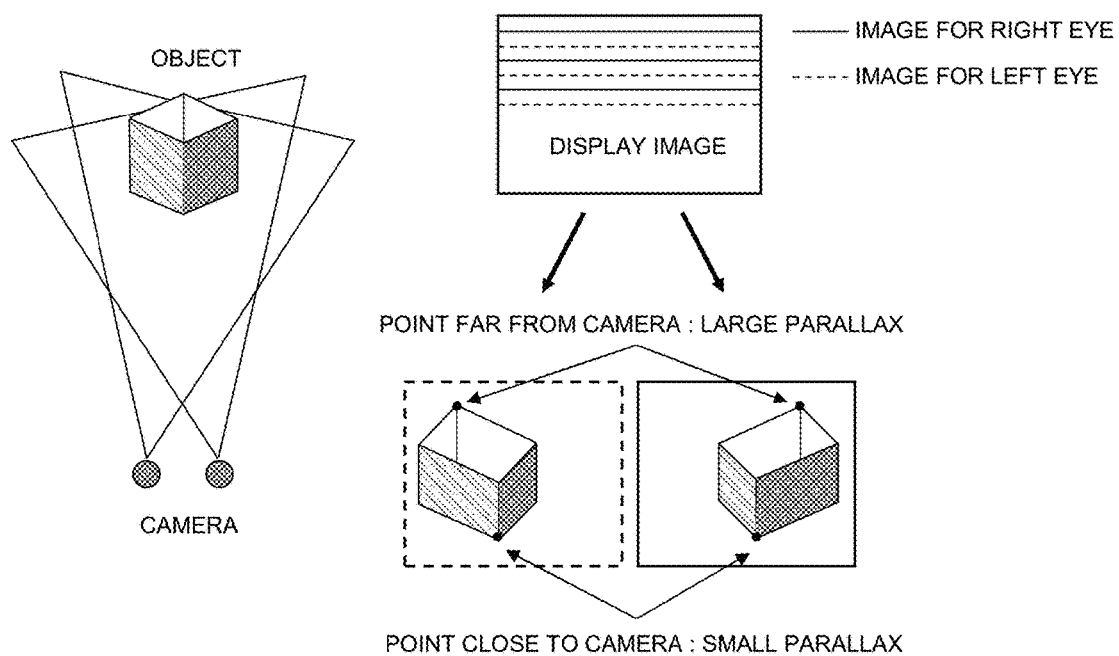
FIG. 12 is a schematic diagram for explaining the parallax caused by the display target.

As shown in FIG. 12, the images for the right eye and left eye taken by two cameras are displayed independently to form the display image displayed on display part 3. Here, the parallax of the images for the right eye and left eye changes depending on the distance from the cameras to the object, so the parallax of the images for the right eye and left eye differs in each point of the display part 3. Specifically, the farther the point is from the cameras, the larger the parallax, and the closer the point is to the camera, the smaller the parallax.

Figure 13:
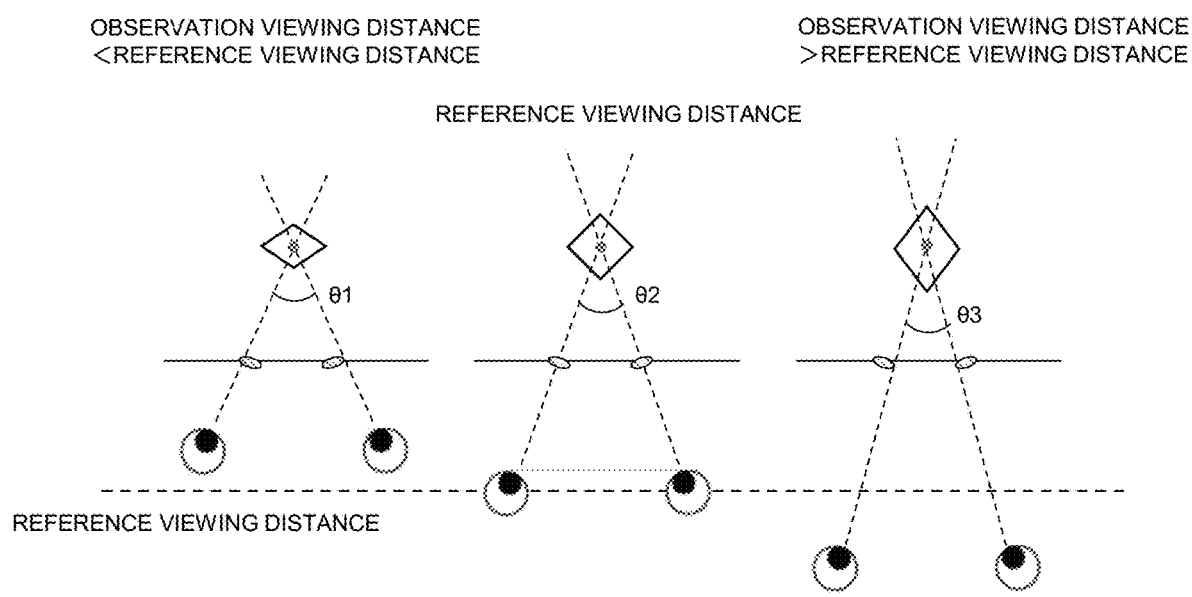
FIG. 13 is a schematic diagram showing how the aspect ratio changes when the user views the display target at the reference viewing distance and in the front and back of the reference viewing distance.

In this embodiment, the parallax adjustment processing is executed in order to correct the "depth distortion" of the display image caused by the change of the observation viewing distance. As shown in FIG. 13, in the case where the aspect ratio (width:depth) of the stereoscopic image viewed at the reference viewing distance is 1:1, the depth of the stereoscopic image appears to be reduced when "the observation viewing distance<the reference viewing distance". On the other hand, in the case where "the observation viewing distance>the reference viewing distance", the depth of the stereoscopic image appears to be extended. This is because an imaging position of the stereoscopic image changes as a convergence angle changes.

<Parallax Adjustment Amount>

Next, the parallax adjustment amount will be described with reference to FIG. 14. The scale adjustment amount described above is the amount for adjusting the visually recognized size of the display image, while the parallax adjustment amount is the amount for adjusting the depth distortion of the display image.

Figure 14:
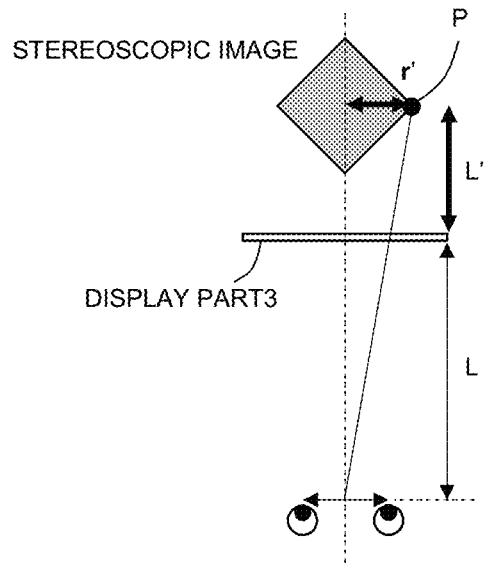
FIG. 14 is a diagram showing a formula that derives an aspect ratio A(L) of the stereoscopic image that is visually recognized by a human

As shown in FIG. 14, in the embodiment, the depth distortion is defined as "an aspect ratio A(L) visible to a human". In addition, it is defined as "the aspect ratio A(L) that is visible to a human=width of the stereoscopic image/the imaging position L' (depth to point P). Then, by substituting L' and r' shown in FIG. 5, it can be represented as "A(L)=2er/Ld".

Here, as shown in FIGS. 6 and 14, when the user observes the display image, having the parallax d at the reference viewing distance (Lbase), at the observation viewing distance (Lobs), the aspect ratio of the display image appears to change. In order to solve this problem and keep the aspect ratio A(L), of the stereoscopic image visually recognized by a human, constant even when observing at the observation viewing distance (Lobs) different from the reference viewing distance (Lbase), the stereoscopic image display device 1 is configured to calculate the parallax adjustment amount β. In the embodiment, when the parallax of the display image is d/∧ at the reference viewing distance (Lbase), the parallax d' of the display image at the observation viewing distance (Lobs) is controlled so as to satisfy the relationship of "d'=(d+β)×α". Here, as shown in FIG. 12, the parallax d of the display image is not constant in the display part 3, so the representative value of the parallax d in the display image is used as the parallax d/∧. And the method of determining the representative value is arbitrary. For example, the representative value may be determined based on the histogram of the parallax in the attention area ROI. And the representative value may be the average value or mode value of the parallax d in the attention area ROI of the display image. Hereinafter, in various calculations, the representative value (parallax d/∧) is used as parallax d.

β is obtained as follows. That is, β is obtained by calculating β such that Raspect, which is the value obtained by dividing "aspect ratio Aobs (Lobs) of the stereoscopic image viewed by a human at the observation viewing distance" by "aspect ratio Abase (Lbase) of the stereoscopic image viewed by a human at the reference viewing distance", becomes 1, thus giving the relationship "β={Lbase (the reference viewing distance)/Lobs (the observation viewing distance)−1}×d/∧".

Here, when parallax d' at the observation viewing distance is calculated using such β, which gives "d'=(d/∧+β)× α=d/∧". That is, by defining β as described above, the parallax d' at the observation viewing distance becomes the same as parallax d/∧, which is the representative value of the parallax d at the reference viewing distance. This makes it possible to visually recognize the stereoscopic image at the same aspect ratio as the aspect ratio at the reference viewing distance even when the distance between the user and the stereoscopic image display device 1 changes.

Next, in S13 of FIG. 11, the parallax adjustment processing is executed by the adjustment part 12. Hereinafter, the parallax adjustment processing will be described with reference to FIGS. 7 to 9.

<From Parallax Adjustment Processing to Scale Adjustment Processing>

Figure 8B:
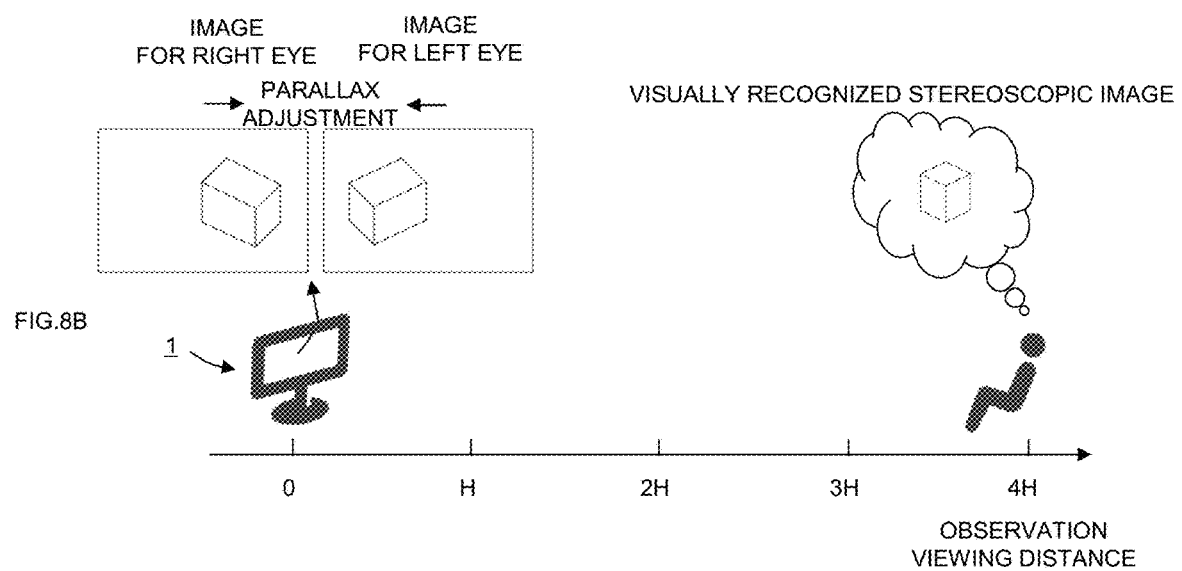
FIG. 8B is a schematic diagram in the case parallax adjustment processing is executed when the user views the stereoscopic image display device 1 at the observation viewing distance.

FIG. 8B represents the state in which parallax adjustment processing is executed in the state of FIG. 7B. The stereoscopic image display device 1 of the embodiment is configured to execute the calculation using β for parallax d/∧, which is a representative value of the parallax d of the display image in FIG. 7A and FIG. 7B. Thus, the stereoscopic image display device 1 allows the user to recognize, even when the user observes the stereoscopic image display device 1 at the observation viewing distance (4H), the display target with the same parallax as when the user observes the stereoscopic image display device 1 at the reference viewing distance (3H).

Here, the parallax adjustment processing in FIG. 8B will be described with reference to FIG. 9. As shown in FIG. 9, the depth of the stereoscopic image, which is visible at the observation viewing distance (4H), appears to increase than the stereoscopic image which is visible at the reference viewing distance (3H). In addition, the size of the stereoscopic image becomes smaller. Thus, β is calculated to execute the parallax adjustment processing. In the example of FIGS. 8 and 9, the parallax d/∧=20 [mm], then β=−5 [mm]. Then, in the parallax adjustment processing, the parallax between the images for the right eye and left eye is adjusted so that the images for the right eye and left eye approach one another to the distance corresponding to β, based on a predetermined point. Assuming that the positive direction is defined as a direction in which the images for the right eye and left eye move away from one another, β is −5 [mm], which is a negative value. As a result, the images for the right eye and left eye move in the direction closer to one another. Specifically, as shown in FIG. 9, the images for the right eye and left eye are shifted in parallel by β/2, respectively. Here, the embodiment is not limited to the configuration that the images for the right eye and left eye are shifted in parallel by β/2. For example, the image for the right eye is shifted closer to the left eye by β/4, and the image for the left eye is shifted closer to the right eye by 3β/4, and the parallax between the images for the right eye and left eye may be reduced by β. In this way, the extension of the depth can be reduced by reducing the parallax. And the user can view, even when the user views the stereoscopic image at the observation viewing distance (4H), the stereoscopic image at the same depth (aspect ratio) as the reference viewing distance (3H).

After that, the size of the stereoscopic image is enlarged by executing the scale adjustment processing. Thus, the stereoscopic image is visually recognized at the same depth (aspect ratio) and the same size as the reference viewing distance (3H) even when the user views the stereoscopic image at the observation viewing distance (4H). This corresponds to adjusting the scaling after adjusting the parallax, and then, it can be represented as "d'=(d/\+β)×α".

In the above example, the case where the observation viewing distance is farther than the reference viewing distance is described. Then, in the case where the observation viewing distance is closer than the reference viewing distance (for example 2H), the parallax adjustment processing adjusts the parallax of the images for the right eye and left eye so as to be far from one another to the distance corresponding to β, based on a predetermined point.

<From Scale Adjustment Processing to Parallax Adjustment Processing>

Figure 8C:
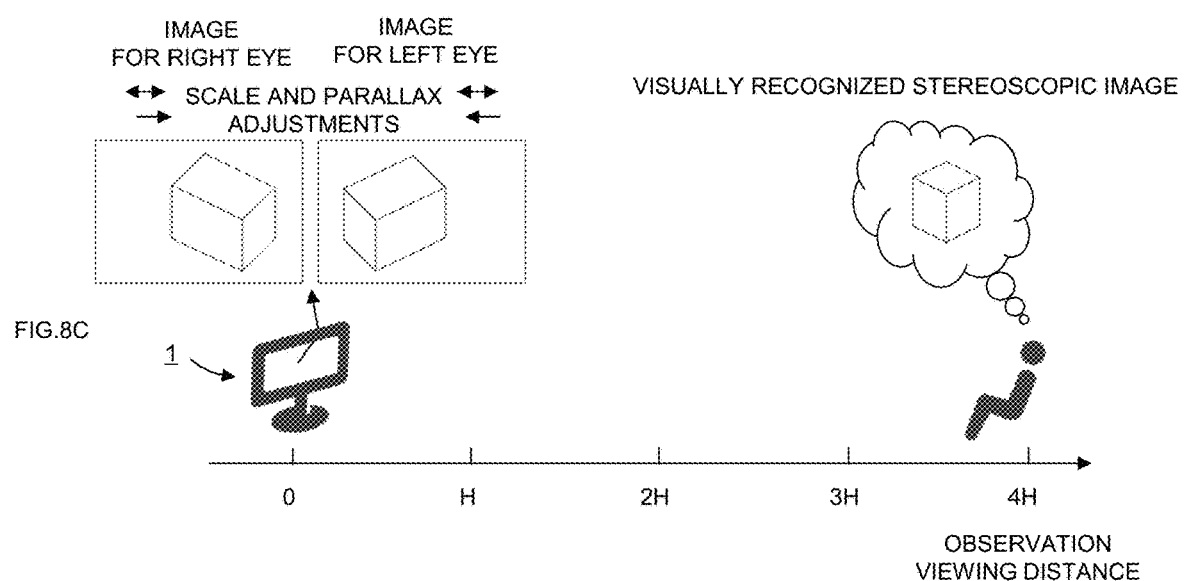
FIG. 8C is a schematic diagram in the case the scale adjustment processing and the parallax adjustment processing are executed when the user views the stereoscopic image display device 1 at the observation viewing distance.

In addition, the parallax adjustment processing may adjust the parallax after adjusting the scaling. As shown in FIG. 8C and FIG. 9, the stereoscopic image display device 1 may execute the parallax adjustment processing to the display image viewed by the user at the observation viewing distance (4H) after executing the scale adjustment processing. In this case, the adjustment part 12 adjusts the images for the right eye and left eye so that the images for the right eye and left eye are closer to or farther from the distance corresponding to "the scale adjustment amount×the parallax adjustment amount", which gives the relationship "d'=d/\×α+β×α". As shown in FIG. 9, this is equivalent to bringing the images for the right eye and left eye closer by one another (βα/2).

Next, in S14 of FIG. 11, the controller 10 determines whether the result after the parallax adjustment processing is the notification target. In the embodiment, it is determined whether the result is the notification target based on whether the parallax adjustment processing is within the controllable range, which will be described with reference to FIG. 15.

<Controllable Parallax Adjustment Range>

Figure 15:
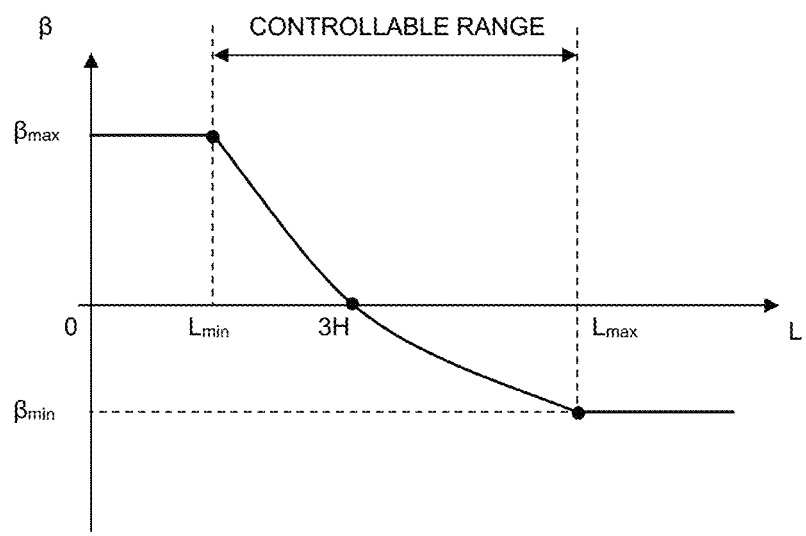
FIG. 15 is a graph showing the parallax range that can be controlled by the stereoscopic image display device 1.

As shown in FIG. 15, between an upper limit (βmax) and a lower limit (βmin) of the parallax adjustment amount, β decreases monotonically with respect to the observation viewing distance L. Then, below Lmin corresponding to βmax, β is βmax, which is constant. On the other hand, above Lmax corresponding to βmin, β is βmin, which is constant. Here, the upper limit and the lower limit of β can be determined as follows.

For example, β can be set to the lower limit when the imaging position of the stereoscopic image is located on the display surface of display part 3 or before the display surface of the display part 3. Specifically, the lower limit βmin may be set to "−dmin" which corresponds to a point at which the imaging position of the stereoscopic image switches from the back to the front of display part 3 when viewed from the user. On the other hand, β can be set to the upper limit when the imaging position of the stereoscopic image is located at infinity. Specifically, the upper limit βmax may be set to "2e−dmax". Because the human eye cannot image with parallax d's exceeding the width 2e of the eye (FIG. 5). In this case, the relationship of "−dmin<β<2e−dmax" is satisfied.

Then, in S14 of FIG. 11, when the controller 10 obtains the result that β is out of the controllable range, the controller 10 determines that the result is the notification target, and the process proceeds to S15. Then, in S15, the notification part 14 notifies the external terminal (example: user terminal) that β is out of the controllable range. That is, in the embodiment, when the parallax adjustment amount at the observation viewing distance is below the lower limit or above the upper limit, the notification part 14 notifies that. This prevents the user from moving to an inappropriate observation viewing distance by notifying the user terminal from notification part 14, for example, when the user is too far away or too close to the stereoscopic image display device 1.

Here, the determination method of the notification target is not limited to this. For example, regarding the width to depth ratio (the aspect ratio) of the stereoscopic image viewed at the observation viewing distance, the notification part 14 may notify it when the variation from the width to depth ratio of the stereoscopic image viewed at the reference viewing distance is outside the range allowed by the user. Here, the variation represents the ratio of the change of the aspect ratio at the observation viewing distance with respect to the aspect ratio at the reference viewing distance. For example, in the case that the variation allowed by the user is 25%, the notification part 14 may notify it when the aspect ratio at the observation viewing distance is outside the 25% range from the aspect ratio at the reference viewing distance. For example, the aspect ratio, when the user observes the stereoscopic image display device 1 at the position corresponding to Lmax shown in FIG. 15, is the same as the aspect ratio at the reference viewing distance. When the user moves further away from the stereoscopic image display device 1, that is, the observation viewing distance increases, the depth of the stereoscopic image visually recognized by the user becomes larger because β is βmin which is constant. However, when the aspect ratio at the observation viewing distance is within the range of 25% from the aspect ratio at the reference viewing distance, the upper limit of the observation viewing distance regarding the notification target can be set larger compared to the above example by allowing the change of the aspect ratio. Here, the range of the variation allowed by the user may be 10, 15, 20, 25, 30, 35, 40, 45, 50%, and the variation may be within the range between any two of the values exemplified here. Further, the notification part 14 may notify it when a predetermined stereoscopic image at the observation viewing distance is no longer imaged.

On the other hand, the aspect ratio, when the user observes the stereoscopic image display device 1 at the position corresponding to Lmin shown in FIG. 15, is the same as the aspect ratio of the stereoscopic image display device 1 observed at the reference viewing distance. When the user further approaches to the stereoscopic image display device 1, that is, the observation viewing distance decreases, the aspect ratio visually recognized by the user becomes smaller because β is βmax which is constant. However, when the aspect ratio at the observation viewing distance is within the range of 25% from the aspect ratio at the reference viewing distance, the lower limit of the observation viewing distance regarding the notification target can be set larger compared to the above example, by allowing the change of the visually recognized size.

That is, the notification part 14 is configured to, when the following cases (1), (2), or (3) is satisfied, notify that a condition of the stereoscopic display device is in the cases (1), (2), or (3).

(1) The parallax adjustment amount at the observation viewing distance is less than the lower limit or more than the upper limit.

(2) The aspect ratio of the display image that is visually recognized at the observation viewing distance is outside the range of 25% from the aspect ratio of the stereoscopic image that is visually recognized at the reference viewing distance.

(3) A predetermined stereoscopic image at the observation viewing distance is no longer imaged. (For example, there is an occlusion area. Here, the occlusion area is an area having no pixel, of one image, that corresponds to the specific pixel of the other image due to shifting the images for the right eye and left eye.)

On the other hand, when β is within the controllable range, the controller 10 determines that the result is not the notification target, and S15 is skipped. In this embodiment, S14 is executed after S13 for the convenience of the explanation. However, S14 may be executed before S13, or S14 may be executed at the same time as S13.

The parallax adjustment processing is described above, and it is important that β is not 0. If β=0, then "A(4H)=2era/4Hd'=2era/4Hd/∧=2er/4Hd/∧, A(3H)=2er/3Hd/∧", and thus the aspect ratio A of the reference viewing distance does not match with the aspect ratio A of the observation viewing distance.

4. Example

Hereinafter, the results of performing the scale adjustment processing and the parallax adjustment processing by the stereoscopic image display device 1 of the embodiment will be described with reference to FIG. 16.

FIG. 16 is showing the results of performing the scale adjustment processing and the parallax adjustment processing at both the distance of 3H (proportional to the height H of the display) and the distance of 970.8 mm with respect to 26 inch (reference) (323.6×574.5 [mm]), 32 inch (398.3×707.1 [mm]), and 55 inch (684.5×1215.4 [mm]) displays (corresponding to display part 3), respectively. Here, various calculations are performed with parallax d/∧=10 [mm] used for the parallax adjustment processing.

When the observation viewing distance is changed to match the display size, the aspect ratios (Raspect) respectively change on the three displays. On the other hand, by performing the parallax adjustment processing, the aspect ratios (Raspect) are 1 on all three displays. That is, by performing the scale adjustment processing and the parallax adjustment processing, the sizes and aspect ratios of the stereoscopic image viewed by the user became the same for all three displays. In this explanation here, the example of performing the scale adjustment processing and the parallax adjustment processing when the display size becomes large has been described. The same applies when the display size is fixed and the image displayed on the screen is enlarged.

On the other hand, when the observation viewing distance is fixed regardless of the display size, and when the aspect ratios (Raspect) are aligned on the three displays, size ratios (Rscale) change.

These adjustments can be tailored to the user's needs and can be used, for example, as the initial settings for the stereoscopic image display device 1.

5. Modified Embodiment

Figure 17:
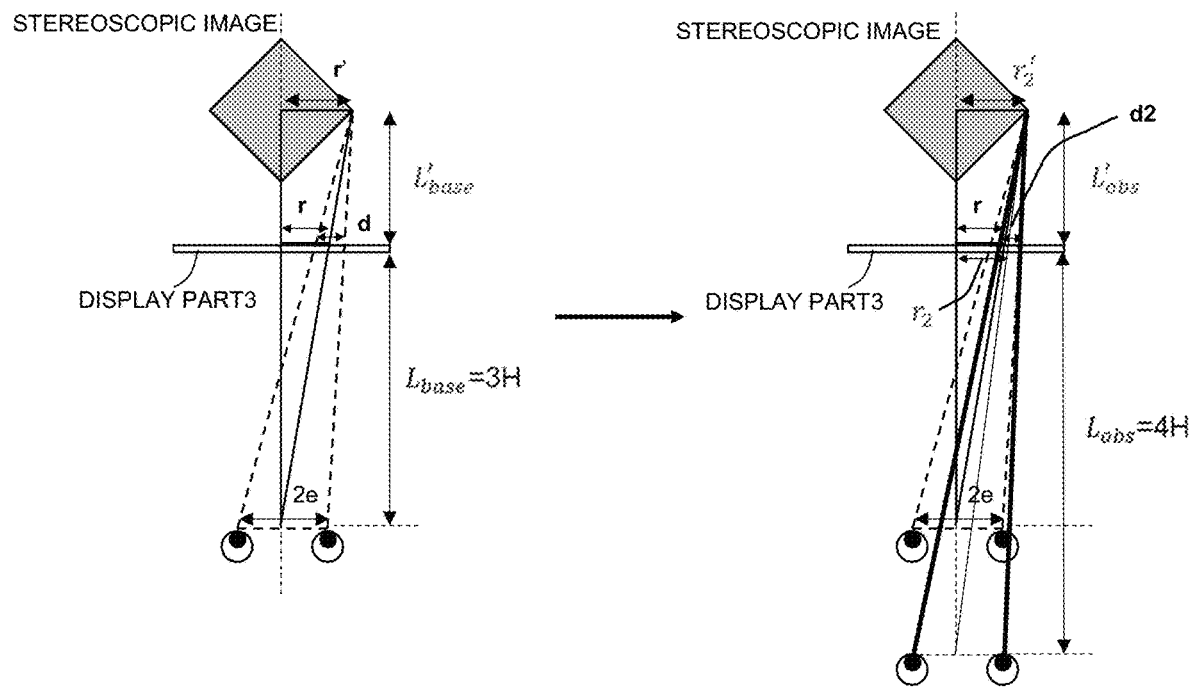
FIG. 17 is a schematic diagram for explaining a modified embodiment of the present invention.

In FIG. 17, at least one of the scale adjustment amount and the parallax adjustment amount is controlled so that the width and the depth of the stereoscopic image viewed by the user are fixed when the observation viewing distance changes. Fixing the width and the depth of the stereoscopic image means controlling so that r' and L' are constant even when the observation viewing distance changes. In FIG. 17, it is controlled so that $r'=r_2'$ and Lbase'=Lobs'. Further, FIG. 18 is a diagram showing formulas for deriving the scale adjustment amount α and the parallax adjustment amount β in the modified embodiment. With these formulas, even when the observation viewing distance changes arbitrarily, the width and the depth of the stereoscopic image viewed by the user can be controlled to be fixed. FIG. 19 illustrates the scale adjustment amount α and the parallax adjustment amount β at reference viewing distance 3H and the observation viewing distance 4H.

That is, in the above-modified embodiment, the adjustment part 12 is configured to adjust the display state of the display image so that the width and the depth of the stereoscopic image at the observation viewing distance are fixed based on the reference viewing distance and the observation viewing distance.

6. Other Embodiments

Although various embodiments have been described above, the stereoscopic image display device 1 according to the embodiment is not limited thereto. The stereoscopic image display device 1 according to the embodiment may be realized in the following configurations.

The stereoscopic image may be a movie.

The stereoscopic image display device 1 may execute at least one of the scale adjustment processing and the parallax adjustment processing based on the size of the display part 3.

The notification by the notification part 14 is performed not only when the visually recognized size or aspect ratio of the display image viewed at the observation viewing distance is outside the range of 25% from the visually recognized size or aspect ratio of the display image viewed at the reference viewing distance, but also when the visually recognized size or aspect ratio of the display image viewed at the observation viewing distance is outside the range of 1 to 30% from the visually recognized size or aspect ratio of the display image viewed at the reference viewing distance.

The adjustment part 12 or the calculation part 13 in the above embodiment may be provided outside the stereoscopic image display device 1, in which case the stereoscopic image display device 1 is configured to receive and display the adjusted or calculated image.

The embodiment may be realized in the following aspect.
A stereoscopic image display method comprising:
acquiring an observation viewing distance that is a viewing distance from a display part to a user;
adjusting a display state of a display image based on a reference viewing distance and the observation viewing distance; and
displaying a stereoscopic image based on the display state.

The embodiment may be realized in the following aspect.
A program causing a computer to function as:
an acquisition part configured to acquire an observation viewing distance that is a viewing distance from a display part to a user;
an adjustment part configured to adjust a display state of a display image based on a reference viewing distance and the observation viewing distance; and
the display part is configured to display a stereoscopic image based on the display state.

The embodiment may be realized as a non-transitory computer readable medium that stores the above-mentioned program.

DESCRIPTION OF REFERENCE SIGNS

1: stereoscopic image display device
2: operation part

3: display part
4: communication part
5: memory part
10: controller
11: acquisition part
12: adjustment part
13: calculation part
14: notification part

The invention claimed is:

1. A stereoscopic image display device comprising:
a display part;
an acquisition part configured to acquire an observation viewing distance that is a viewing distance from the display part to a user;
a calculation part configured to calculate a parallax adjustment amount and a scale adjustment amount,
the parallax adjustment amount being an amount to adjust a depth distortion of a display image,
the scale adjustment amount being an amount to adjust a scale of the display image; and
an adjustment part configured to adjust a display state of the display image based on a reference viewing distance and the observation viewing distance, wherein
the display part is configured to display a stereoscopic image based on the display state,
the calculation part calculates the parallax adjustment amount based on the reference viewing distance, the observation viewing distance and a parallax,
the calculation part calculates the scale adjustment amount based on the reference viewing distance, the observation viewing distance, the parallax, and an eye width,
a width of the stereoscopic image visually recognized at the reference viewing distance is defined as a first width, and a distance from the display part to an imaging position of the stereoscopic image visually recognized at the reference viewing distance is defined as a first distance,
the width of the stereoscopic image visually recognized at the observation viewing distance are defined as a second width, and the distance from the display part to the imaging position of the stereoscopic image visually recognized at the observation viewing distance is defined as a second distance,
the adjustment part is configured to adjust the display state of the display image by controlling the parallax adjustment amount and the scale adjustment amount so that the second width is equal to the first width and the second distance is equal to the first distance.

2. The stereoscopic image display device of claim 1, wherein the calculation part configured to calculate the scale adjustment amount, the adjustment part
is configured to adjust the display scaling of the display image according to following control equation 1 or control equation 2, $(Ro)=(Rs \times \text{the scale adjustment amount})$, then    <The control equation 1>

Ro: the display scaling of the display image visually recognized at the observation viewing distance,
Rs: the display scaling of the display image visually recognized at the reference viewing distance, $(So)=(Ss \times \text{the scale adjustment amount})$, then    <The control equation 2>

So: a size of the display image visually recognized at the observation viewing distance,
Ss: a size of the display image visually recognized at the reference viewing distance.

3. The stereoscopic image display device of claim 1 further comprising: a notification part; wherein the calculation part is configured to calculate the scale adjustment amount, and wherein at least one of lower and upper limits is set for the scale adjustment amount based on relative sizes of the display image and the display part,
the notification part is configured to, when the following cases (1) or (2) is satisfied, notify that a condition of the stereoscopic image device is in the cases (1) or (2):
(1) The scale adjustment amount of the display image visually recognized at the observation viewing distance is less than the lower limit or more than the upper limit; and
(2) A variation between a size of the display image visually recognized at the observation viewing distance and a size of the display image visually recognized at the reference viewing distance is outside a range allowed by the user.

4. The stereoscopic image display device of claim 1, wherein
the calculation part configured to calculate the parallax adjustment amount below, (the parallax adjustment amount)={(the reference viewing distance/the observation viewing distance)−1}, the adjustment part is configured to adjust the parallax of the display image using the parallax adjustment amount.

5. The stereoscopic image display device of claim 4, wherein
the display part is configured to display images for the right eye and left eye independently,
the adjustment part is configured to adjust the images for the right eye and left eye so that
(1) the images for the right eye and left eye are close to or are far from one another to a distance corresponding to the parallax adjustment amount, or
(2) the images for the right eye and left eye are close to or are far from one another to a distance corresponding to a product of the scale adjustment amount and the parallax adjustment amount.

6. The stereoscopic image display device of claim 4, wherein
when an imaging position of the stereoscopic image is located on a display surface of the display part or is located in front of the display surface, the parallax adjustment amount is a lower limit.

7. The stereoscopic image display device of claim 4, wherein
when an imaging position of the stereoscopic image is located at infinity, the parallax adjustment amount is an upper limit.

8. The stereoscopic image display device of claim 6 further comprising:
a notification part; wherein
the notification part is configured to, when following cases (1), (2), or (3) is satisfied, notify that a condition of the stereoscopic image display device is in the cases (1), (2), or (3):
(1) The parallax adjustment amount of the display image visually recognized at the observation viewing distance is less than the lower limit;
(2) A variation between a width to depth ratio of the stereoscopic image visually recognized at the observation viewing distance and a width to depth ratio of the stereoscopic image visually recognized at the reference viewing distance is outside a range allowed by the user; and (3) A predetermined stereoscopic image at the observation viewing distance is no longer imaged.

9. The stereoscopic image display device of claim 7 further comprising:
a notification part; wherein
the notification part is configured to, when following cases (1), (2), or (3) is satisfied, notify that a condition of the stereoscopic image display device is in the cases (1), (2), of (3):
(1) The parallax adjustment amount at the observation viewing distance is more than the upper limit;
(2) A variation between a width to depth ratio of the stereoscopic image that is visible at the observation viewing distance and a width to depth ratio of the stereoscopic image that is visible at the reference viewing distance is outside a range allowed by the user; and
(3) A predetermined stereoscopic image at the observation viewing distance is no longer imaged.

10. The stereoscopic image display device of claim 4, wherein
the parallax is determined based on a histogram of the parallax included in an attention area of the display part.

11. A stereoscopic image display method comprising:
acquiring an observation viewing distance that is a viewing distance from a display part to a user;
calculating a parallax adjustment amount and a scale adjustment amount,
the parallax adjustment amount being an amount to adjust a depth distortion of a display image,
the scale adjustment amount being an amount to adjust a scale of the display image; and
adjusting a display state of the display image based on a reference viewing distance and the observation viewing distance, and adjusting the display state of the display image based on the reference viewing distance and the observation viewing distance so that a width and a depth of a stereoscopic image visually recognized at the observation viewing distance are fixed; and
displaying the stereoscopic image based on the display state, wherein
the parallax adjustment amount is calculated based on the reference viewing distance, the observation viewing distance and a parallax,
the scale adjustment amount is calculated based on the reference viewing distance, the observation viewing distance, the parallax, and an eye width,
a width of the stereoscopic image visually recognized at the reference viewing distance is defined as a first width, and a distance from the display part to an imaging position of the stereoscopic image visually recognized at the reference viewing distance is defined as a first distance,
the width of the stereoscopic image visually recognized at the observation viewing distance are defined as a second width, and the distance from the display part to the imaging position of the stereoscopic image visually recognized at the observation viewing distance is defined as a second distance,
the display state of the display image is adjusted by controlling the parallax adjustment amount and the scale adjustment amount so that the second width is equal to the first width and the second distance is equal to the first distance.

12. A non-transitory computer readable medium that stores a program causing a computer to function as:
a display part;
an acquisition part configured to acquire an observation viewing distance that is a viewing distance from the display part to a user;
a calculation part configured to calculate a parallax adjustment amount and a scale adjustment amount,
the parallax adjustment amount being an amount to adjust a depth distortion of a display image,
the scale adjustment amount being an amount to adjust a scale of the display image; and
an adjustment part configured to adjust a display state of the display image based on a reference viewing distance and the observation viewing distance, wherein
the display part is configured to display a stereoscopic image based on the display state,
the calculation part calculates the parallax adjustment amount based on the reference viewing distance, the observation viewing distance and a parallax,
the calculation part calculates the scale adjustment amount based on the reference viewing distance, the observation viewing distance, the parallax, and an eye width,
a width of the stereoscopic image visually recognized at the reference viewing distance is defined as a first width, and a distance from the display part to an imaging position of the stereoscopic image visually recognized at the reference viewing distance is defined as a first distance,
the width of the stereoscopic image visually recognized at the observation viewing distance are defined as a second width, and the distance from the display part to the imaging position of the stereoscopic image visually recognized at the observation viewing distance is defined as a second distance,
the adjustment part is configured to adjust the display state of the display image by controlling the parallax adjustment amount and the scale adjustment amount so that the second width is equal to the first width and the second distance is equal to the first distance.

* * * * *